(12) United States Patent
Nelson et al.

(10) Patent No.: US 8,102,332 B2
(45) Date of Patent: Jan. 24, 2012

(54) INTENSITY SCALING FOR MULTI-PROJECTOR DISPLAYS

(75) Inventors: Steve Nelson, San Jose, CA (US); Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 400 days.

(21) Appl. No.: 12/506,901

(22) Filed: Jul. 21, 2009

(65) Prior Publication Data
US 2011/0019108 A1   Jan. 27, 2011

(51) Int. Cl.
*G09G 5/00* (2006.01)
(52) U.S. Cl. .......................................... 345/1.1; 345/204
(58) Field of Classification Search ............ 345/1.1–2.3, 345/6, 204, 660; 348/739, 745; 353/46, 353/69, 70
See application file for complete search history.

(56) References Cited

U.S. PATENT DOCUMENTS

| | | | |
|---|---|---|---|
| 6,040,876 A | 3/2000 | Pettitt et al. | |
| 6,733,138 B2 | 5/2004 | Raskar | |
| 6,804,406 B1 | 10/2004 | Chen | |
| 6,921,172 B2 | 7/2005 | Ulichney et al. | |
| 7,182,465 B2 * | 2/2007 | Fuchs et al. | 353/69 |
| 7,292,207 B1 | 11/2007 | Naegle et al. | |
| 7,367,681 B2 | 5/2008 | Harboe | |
| 2007/0188719 A1 | 8/2007 | Jaynes et al. | |
| 2008/0024683 A1 | 1/2008 | Damera-Venkata et al. | |
| 2008/0095363 A1 * | 4/2008 | DiCarto et al. | 380/203 |
| 2008/0309884 A1 * | 12/2008 | O'Dor et al. | 353/7 |

OTHER PUBLICATIONS

Raskar, R., et al., "Seamless Projection Overlaps Using Image Warping and Intensity Blending", Fourth International Conference on Virtual Systems and Multimedia, Nov. 1998.
Tsai, Y., et al., "Generating a Multiresolution Display by Integrating Multiple Projectors", IEEE International Workshop on Projector-Camera Systems, Oct. 12, 2003.
Surati, R. J., "Scalable Self-Calibrating Display Technology for Seamless Large-Scale Displays", Massachusetts Institute of Technology, Electrical Engineering and Computer Science, Jan. 1999.

* cited by examiner

*Primary Examiner* — Ricardo L Osorio

(57) ABSTRACT

Methods having corresponding apparatus and computer-readable media comprise: receiving a first digital image representing a first composite projection, wherein each first composite projection comprises a plurality of overlapping component projections, wherein each of the component projections is generated by a respective projector; and generating one or more respective first intensity scaling maps for each of the projectors, comprising, for each of the first intensity scaling maps, identifying a displayed non-overlap projection region for the projector associated with the first intensity scaling map based on the first digital image, and generating a first intensity scaling map for the projector, comprising determining a distance to the nearest pixel within the displayed non-overlap region of the projector for each pixel outside the non-overlap region of the projector, and assigning a first intensity scaling value to each pixel outside the displayed non-overlap region of the projector based on the respective distance.

21 Claims, 30 Drawing Sheets

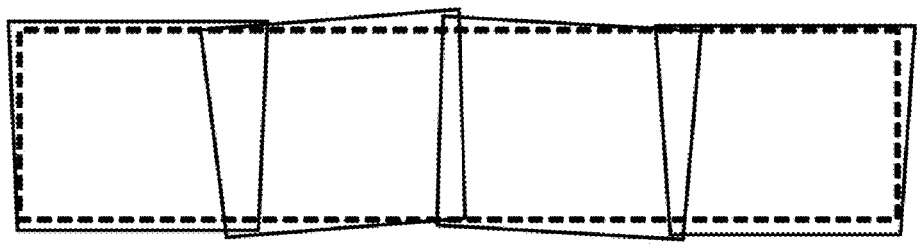
FIG. 3
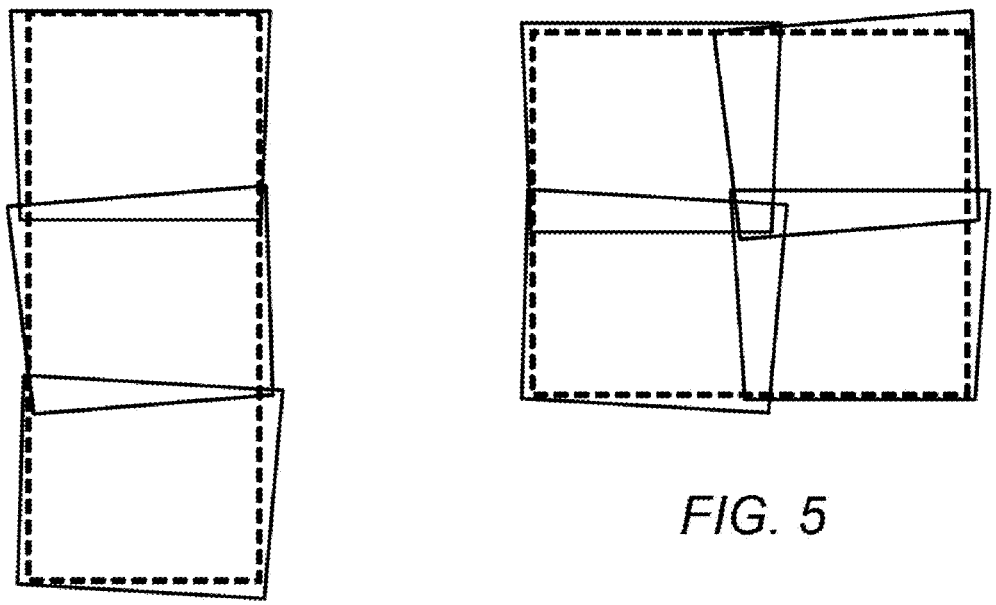
FIG. 5
FIG. 4
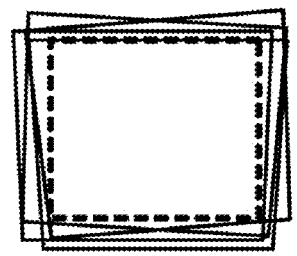
FIG. 6

```
For each physical device pixel:
    Gather output device pixel coordinate
    Find a deterministic device pixel coordinate near the output device
pixel *NOTE(1)(2)
    Get count of logical coordinate(s) associated with the deterministic
device pixel
    For each logical coordinate:
        Gather BRI value
    Compute ditherBRI as an average of gathered BRI values Get count of logical content coordinate(s) associated with the output
device pixel
    For each logical coordinate:
        Gather RGB color value from the source content
        Gather BRI value
    Compute input color as an average of gathered RGB color source content
pixel values
    Compute BRI as an average of gathered BRI values If BRI is greater than 1.0, set output color to black
    If BRI is 1.0, set output color to input color
    If BRI is less than 1.0
        Get input color brightness
        Compute adjusted BRI as a function of ditherBRI, BRI, and input
color brightness
        Set output color as a function of input color, adjusted BRI, and
gamma correction
    end

* NOTE(1): The described method continually computes average BRI (BRI = intensity
scaling value) and ditherBRI for every logical pixel. Unlike source content
pixels, the average BRI values associated with physical device pixels do not
change, so average BRI and ditherBRI values could be pre-computed and passed to
the fragment shader in a separate texture indexed by the GL texture coordinate to
avoid unnecessary per pixel computations. Some of this data could be included in
the unused part of the existing offsets texture, for example.

* NOTE(2): Instead of a single value per projector, the ditherRange argument
could be provided with other BRI data inside texture tables so that, for example,
the range could differ according to which edge, size, or region is being operated
upon.
```

FIG. 29

```
extension GL_EXT_gpu_shader4 : enable uniform sampler2D  inputTex;     // Source Content Texture
uniform sampler2D  offsetsTex;   // Device to VPM Coordinate List Texture
uniform sampler2D  coordsTex;    // VPM Coordinate List Texture
uniform float      coordWidth;   // Width of VPM Texture
uniform float      coordHeight;  // Height of VPM Texture
uniform vec2       ditherRange;  // Width / Height of Dither Range
uniform vec4       adjGamma;     // Per Channel Adjustment Gamma void main (void)
{
        float xstep = 1.0/coordWidth;    // Coordinate list texture column
unit
        float ystep = 1.0/coordHeight;   // Coordinate list texture row unit vec4 offset = vec4(0.0, 0.0, 0.0, 1.0);
        vec2 tex    = vec2(0.0, 0.0);
        int nCoords;

//-------------------------------------------------------------- Get
ditherBRI
        // Gather deterministic noise adjusted average ditherBRI value
*NOTE(1)
        float ditherBRI = 0.0;
        tex = gl_TexCoord[1].st; // Device Coordinate Requested (0.0-
1.0),(0.0-1.0)
        // Use device coordinate to obtain a value in the range -.5 to +.5
        float fAdj = fract(sin(dot(tex,vec2(12.9898,78.233)))*43758.5453)-
.5;
        tex.x += fAdj * ditherRange.x * xstep; // *NOTE(2)
        tex.y += fAdj * ditherRange.y * ystep; // *NOTE(2)
        if (tex.x <= 0. || tex.x >= 1.0 || tex.y <= 0. || tex.y >= 1.0) {
            ditherBRI = 1.0; // Out of device pixels bounds... use average
BRI
        } else {
          offset = vec4(texture2D(offsetsTex, tex));
          nCoords = int(offset.b);
          for(int i = 0; i < nCoords; i++) {
          vec4 coord = vec4(texture2D(coordsTex, offset.st));
              ditherBRI += coord.p;
              offset.s += xstep;
              if (offset.s >= 1.0) { // Advance to next row
                  offset.s = 0.0; offset.t += ystep;
              }
          }
          if (offset.b > 0.0) ditherBRI = ditherBRI / offset.b;
        }
```

FIG. 30A

```
                //------------------------------------------------------------ Get
COLOR and BRI
        // Gather the average source input pixel COLOR and BRI values
*NOTE(1)
        tex = gl_TexCoord[1].st; // Device Coordinate Requested (0.0-
1.0),(0.0-1.0)
        offset = vec4(texture2D(offsetsTex, tex));
        nCoords = int(offset.b);
        float BRI = 0.0;
        vec4 clr = vec4(0.0, 0.0, 0.0, 1.0);
        for(int i = 0; i < nCoords; i++) {
            vec4 coord = vec4(texture2D(coordsTex, offset.st));
            BRI += coord.p;
            vec4 incolor = vec4(texture2D(inputTex, coord.st));
            offset.s += xstep;
            if (offset.s >= 1.0) { // Advance to next row
                offset.s = 0.0; offset.t += ystep;
            }
        }
        if (offset.b > 0.0) {
            BRI = BRI / offset.b; // average BRI
            clr = clr / offset.b; // average COLOR
        } clr = clamp (clr, 0.0, 1.0);
```

*FIG. 30B*

```
//------------------------------------------------------------- Apply
BRI
        if (BRI < 1.0) { // Overlapping Region
            // Compute amount of dither *NOTE(3)
            float maxVal = max(clr.r, max(clr.g, clr.b)); // get source
pixel brightness
            float amtDither = 1.0-maxVal;
            if (ditherBRI >= 1.0) ditherBRI = BRI;
            float adjBRI = amtDither * ditherBRI + (1.0-amtDither) * BRI;
            // Adjust Gamma and Compute BRI Adjusted Pixel Color
            if (adjGamma.r > 0.0) // red channel
                clr.r = clr.r * pow (adjBRI, adjGamma.r);
            if (adjGamma.g > 0.0) // green channel
                clr.g = clr.g * pow (adjBRI, adjGamma.g);
            if (adjGamma.b > 0.0) // blue channel
                clr.b = clr.b * pow (adjBRI, adjGamma.b);
        } else if (BRI > 1.0) { // Non-Overlapping OUT-OF-BOUNDS Region
            clr = vec4 (0., 0., 0., 1.); // set to black
        }
        clr.a = 1.0;
        gl_FragColor = clamp (clr, 0.0, 1.0); // Emit COLOR for output
    }

* NOTE(3): The sample method uses a percentage of the average ditherBRI and
the BRI values such that more dither is used when the source input pixels are dim
and more average BRI is used when they are bright. The current code equally
distributes use such that a 50%/50% use point falls mid way through the source
brightness range. One could arrange another method that uses ditherBRI only when
source brightness steps below a specific threshold. Or, one could rebalance or
adjust the percentage scale such that only ditherBRI is used when below a
threshold, unused above another threshold, and averages within the threshold
values.
```

*FIG. 30C*

INTENSITY SCALING FOR MULTI-PROJECTOR DISPLAYS

FIELD

The present disclosure relates generally to multi-projector displays. More particularly, the present disclosure relates to generating intensity scaling maps for use in compensating for excess brightness in areas where the projections of two or more projectors overlap.

BACKGROUND

With an ever growing desire to see more information with better quality, large screen displays have become quite popular. Increasing screen resolutions and sizes are continually emerging and made available in televisions, computer monitors, and other video devices. Until recent times, large screen displays were typically too costly, physically unwieldy, or simply unavailable. Video projectors provided one solution, enabling a wide range of communication and entertainment functions by offering a significantly greater display area relatively inexpensively. These devices have found application in conference rooms for presentations, home theaters, classroom training, and advertising billboard displays.

Similar to other video device technologies, video projectors continue to advance their displayable pixel resolution and light output. Today commodity projectors are brighter, offer better quality, and are often less expensive than those of prior years. Highly portable projectors (in both weight and size) are also becoming readily available. No longer do commodity projectors remain constrained to dimly lit rooms with well prepared display surfaces. A video projector's small physical size relative to its large projection output therefore remains appealing.

Even with these improvements, however, it is still difficult or impossible for a single commodity projector to achieve very high resolutions, project over vast areas, or create bright projections on very bright surface areas (for example, near day lit windows). Applications demanding such display qualities, however, are becoming more desirable. The benefits of increased resolution, brightness, and larger display surface area have proven useful for reaching bigger audiences and providing full-scale life-sized immersive environments. Unfortunately, construction of such large displays is complex and costly.

One common technique, such as grouping multiple projectors together and tiling their projection output to produce large screen displays of any desired size, presents challenging problems with registration (that is, alignment of projector pixels). Color and luminosity variance across separate devices and even within a given device is difficult to correct. Minor shape or geometric inconsistencies of the display surface can also hinder adequate results. Projector lumens, or light output, may not be adequate for brighter locations. Synchronizing content delivery to the individual components forming in the larger display are additional hurdles to solve.

Solutions to some of these system problems take many forms. Many require precise pixel and color alignment using manual methods that require physical adjustment of the projector placement. If the output pixels from one projector are not close enough to those from another projector, a visible gap may occur between the projections on the composite display. Likewise, overlapping pixels across projectors produce bright seams that are also objectionable. High-end projectors with specialized lens optics or edge blending/blurring filters may be available to reduce some of these troubles, but are far from optimal.

Specialized projectors and mounting hardware, measurement tools, and tedious calibration methods are additional requirements that add to the resource costs and complexities of physical projector alignment which can become too demanding too for the average user. The advanced skills and time requirements are more than most will invest. In many configurations, physical alignment may even be impossible using projectors with limited optic pathways, or with even slightly irregular display surfaces. When changes are necessary to replace failed lamps, the calibration methods often need repeating.

What is needed is a system that provides an easy calibration and playback mechanism offering the typical user an automated method to create a composite display from a set of commodity projectors. This method should offer a relatively quick one-time calibration function to be performed once after casual projector placement or changes.

SUMMARY

In general, in one aspect, an embodiment features tangible computer-readable media embodying instructions executable by a computer to perform a method comprising: receiving a first digital image representing a first composite projection on a display surface, wherein each first composite projection comprises a plurality of overlapping component projections, wherein each of the component projections is generated by a respective projector; and generating one or more respective first intensity scaling maps for each of the projectors, comprising, for each of the first intensity scaling maps identifying a displayed non-overlap projection region for the projector associated with the first intensity scaling map based on the first digital image, wherein the displayed non-overlap projection region is that portion of the respective first component projection that is within a maximum display area of the composite projection, but does not overlap with any other component projection, and generating a first intensity scaling map for the projector, comprising determining a distance to the nearest pixel within the displayed non-overlap region of the projector for each pixel outside the non-overlap region of the projector, and assigning a first intensity scaling value to each pixel outside the displayed non-overlap region of the projector based on the respective distance; wherein a second composite projection is generated upon the display surface by the projectors based on a second digital image and the first intensity scaling maps.

Embodiments of the tangible computer-readable media can include one or more of the following features. In some embodiments, generating a first intensity scaling map for the projector further comprises: assigning a minimum first intensity scaling value to each pixel inside the non-overlap region. In some embodiments, generating the first intensity scaling map for the projector further comprises, before computing the distances: selecting a bounding rectangle containing the respective component projection in the first digital image; and copying contents of the bounding rectangle to a rectangular image, wherein the short side of the rectangular image is at least twice as long as the long side of the bounding rectangle. In some embodiments, generating the first intensity scaling map for the projector further comprises, after computing the distances: cropping the rectangular image according to the respective component projection; masking the rectangular image according to the maximum display area of the respective composite projection; and masking the rectangular image according to the respective projector bounding rectangle. In some embodiments, the method further comprises: generating a respective second intensity scaling map based on each first intensity scaling map, comprising generating second intensity scaling values for each second intensity scaling map based on the first intensity scaling values of the respective first intensity scaling map; wherein the second composite projection is generated upon the display surface by the projectors based on the second digital image, the first intensity scaling maps, and the second intensity scaling maps. In some embodiments, generating the second intensity scaling values further comprises: selecting a first pixel of one of the second intensity scaling maps; selecting a second pixel of the respective first intensity scaling map based on a location of the first pixel in the one of the second intensity scaling maps and a dimension of the respective first intensity scaling map; and assigning the intensity scaling value of the second pixel to the first pixel. In some embodiments, the method further comprises: generating a respective component projection image for each of the projectors based on the one or more respective first intensity scaling maps, the one or more respective second intensity scaling maps, and intensity values of the second digital image; wherein the second composite projection is generated upon the display surface by the projectors based on the respective component projection images.

In general, in one aspect, an embodiment features an apparatus comprising: an input module adapted to receive a first digital image representing a first composite projection on a display surface, wherein each first composite projection comprises a plurality of overlapping component projections, wherein each of the component projections is generated by a respective projector; and a first intensity scaling module adapted to generate a respective first intensity scaling map for each of the projectors, comprising a region module adapted to identify a respective displayed non-overlap projection region for each projector based on the first digital image, wherein each displayed non-overlap projection region is within a maximum display area of the first composite projection, but does not overlap with any other component projection, and a map module adapted to generate a respective first intensity scaling map for each projector, comprising a distance module adapted to determine a distance to the nearest pixel within the displayed non-overlap region of the projector for each pixel outside the non-overlap region of the projector, and a first intensity module adapted to assign a first intensity scaling value to each pixel outside the displayed non-overlap region of the projector based on the respective distance; wherein a second composite projection is generated upon the display surface by the projectors based on a second digital image and the first intensity scaling maps.

Embodiments of the apparatus can include one or more of the following features. In some embodiments, the intensity module assigns a minimum first intensity scaling value to each pixel inside the non-overlap regions. In some embodiments, the distance module, before computing the distances, selects a bounding rectangle containing the respective component projection in the first digital image, and copies contents of the bounding rectangle to a rectangular image, wherein the short side of the rectangular image is at least twice as long as the long side of the bounding rectangle. In some embodiments, the distance module, after computing the distances, crops the rectangular image according to the respective component projection; masks the rectangular image according to the maximum display area of the respective composite projection; and masks the rectangular image according to the respective projector bounding rectangle. Some embodiments comprise a second intensity scaling module adapted to generate a respective second intensity scaling map based on each first intensity scaling map, comprising a second intensity module adapted to generate second intensity scaling values for each second intensity scaling map based on the first intensity scaling values of the respective first intensity scaling map; wherein the second composite projection is generated upon the display surface by the projectors based on the second digital image, the first intensity scaling maps, and the second intensity scaling maps. In some embodiments, the second intensity module comprises: a first selection module adapted to select a first pixel of one of the second intensity scaling maps; a second selection module adapted to select a second pixel of the respective first intensity scaling map based on a location of the first pixel in the one of the second intensity scaling maps and a dimension of the respective first intensity scaling map; and an assignment module adapted to assign the intensity scaling value of the second pixel to the first pixel. Some embodiments comprise a projection module adapted to generate a respective component projection image for each of the projectors based on the one or more respective first intensity scaling maps, the one or more respective second intensity scaling maps, and intensity values of the second digital image; wherein the second composite projection is generated upon the display surface by the projectors based on the respective component projection images.

In general, in one aspect, an embodiment features a method comprising: receiving a first digital image representing a first composite projection on a display surface, wherein each first composite projection comprises a plurality of overlapping component projections, wherein each of the component projections is generated by a respective projector; and generating one or more respective first intensity scaling maps for each of the projectors, comprising, for each of the first intensity scaling maps identifying a displayed non-overlap projection region for the projector associated with the first intensity scaling map based on the first digital image, wherein the displayed non-overlap projection region is that portion of the respective first component projection that is within a maximum display area of the composite projection, but does not overlap with any other component projection, and generating a first intensity scaling map for the projector, comprising determining a distance to the nearest pixel within the displayed non-overlap region of the projector for each pixel outside the non-overlap region of the projector, and assigning a first intensity scaling value to each pixel outside the displayed non-overlap region of the projector based on the respective distance; wherein a second composite projection is generated upon the display surface by the projectors based on a second digital image and the first intensity scaling maps.

Embodiments of the method can include one or more of the following features. In some embodiments, generating a first intensity scaling map for the projector further comprises: assigning a minimum first intensity scaling value to each pixel inside the non-overlap region. In some embodiments, generating the first intensity scaling map for the projector further comprises, before computing the distances: selecting a bounding rectangle containing the respective component projection in the first digital image; and copying contents of the bounding rectangle to a rectangular image, wherein the short side of the rectangular image is at least twice as long as the long side of the bounding rectangle. In some embodiments, generating the first intensity scaling map for the projector further comprises, after computing the distances: cropping the rectangular image according to the respective component projection; masking the rectangular image according to the maximum display area of the respective composite projection; and masking the rectangular image according to the respective projector bounding rectangle. Some embodiments comprise generating a respective second intensity scaling map based on each first intensity scaling map, comprising generating second intensity scaling values for each second intensity scaling map based on the first intensity scaling values of the respective first intensity scaling map; wherein the second composite projection is generated upon the display surface by the projectors based on the second digital image, the first intensity scaling maps, and the second intensity scaling maps. In some embodiments, generating the second intensity scaling values further comprises: selecting a first pixel of one of the second intensity scaling maps; selecting a second pixel of the respective first intensity scaling map based on a location of the first pixel in the one of the second intensity scaling maps and a dimension of the respective first intensity scaling map; and assigning the intensity scaling value of the second pixel to the first pixel. Some embodiments comprise generating a respective component projection image for each of the projectors based on the one or more respective first intensity scaling maps, the one or more respective second intensity scaling maps, and intensity values of the second digital image; wherein the second composite projection is generated upon the display surface by the projectors based on the respective component projection images.

The details of one or more implementations are set forth in the accompanying drawings and the description below. Other features will be apparent from the description and drawings, and from the claims.

DESCRIPTION OF DRAWINGS

FIGS. 3-6 demonstrate some possible display configurations incorporating as many as four projector devices.

FIG. 29 shows pseudo-code for intensity scaling according to one embodiment.

FIGS. 30A-C show code for an example implementation using a fragment shader program for GPU processing.

Figure 1:
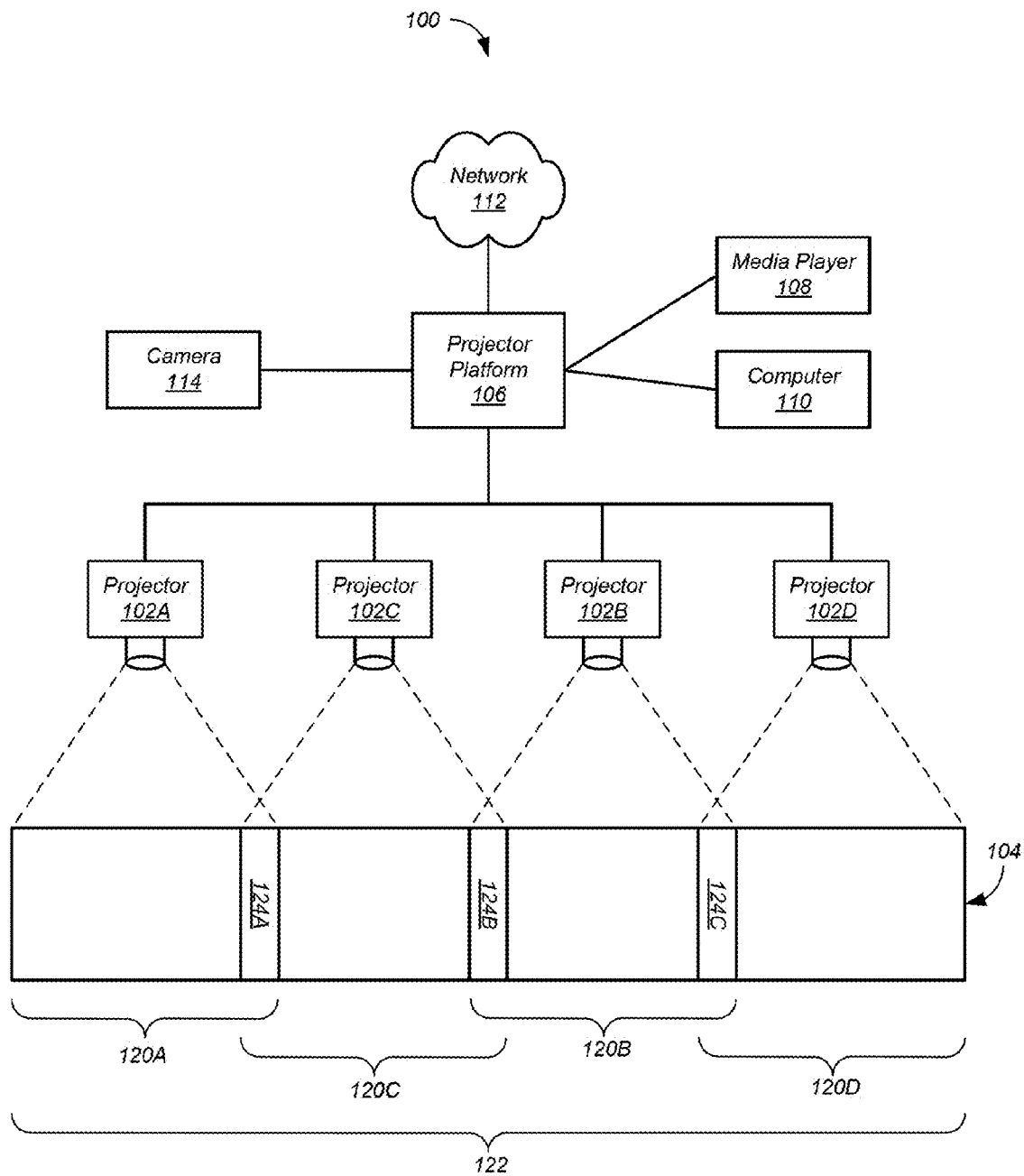
FIG. 1 shows a multi-projector display system according to some embodiments.

The leading digit(s) of each reference numeral used in this specification indicates the number of the drawing in which the reference numeral first appears.

DETAILED DESCRIPTION

Embodiments disclosed herein relate to intensity scaling for overlap regions of projections of multi-projector displays. A well-known problem with the use of multiple projectors to generate a single display is the increased intensity in regions where the projections overlap. Various approaches have been developed to resolve this problem. One class of approaches is referred to as "intensity scaling." According to these approaches, for each projector, intensity weights are assigned to pixels in the overlap regions. These intensity weights are generally applied during rendering, thereby normalizing the brightness in overlap regions so the regions are not noticeable to viewers.

Some embodiments provide a multi-projector display system where each of the projectors generates a respective component projection. The component projections together form a composite projection. For clarity, the regions of the display where the component projections do not overlap are referred to herein as "non-overlap regions."

For each projector, an intensity scaling map is generated according to the following process. The non-overlap region for the projector is determined and masked according to a maximum display area of the composite projection. For each pixel outside the non-overlap region of the projector, a distance to the nearest pixel within the non-overlap region of the projector is computed. An intensity scaling value is assigned to each pixel outside the non-overlap region based on the respective distance, for example in the range between 0 and 1. A minimum intensity scaling value is assigned to each pixel inside the non-overlap region, for example 0. Each projector generates a respective component image according to the respective intensity scaling map, thereby producing the composite image.

In some situations, for example when displaying large single-color blocks at low intensities, the use of intensity scaling maps can create a stair-stepping effect.

This effect results from the fact that few intensity levels are available for intensity scaling at low intensity levels. Some embodiments of the present invention employ smoothing techniques to mitigate this effect. The disclosed smoothing techniques can be used with any intensity scaling maps, and are not limited to use with intensity scaling maps generated according to embodiments disclosed herein.

Before describing these embodiments, a process for a projector platform to create a composite seamless display with the output of a set of video projectors is described. First an automated calibration method is described. Then a projection player process for displaying media on the composite display is described. Calibration and playback may take many forms and can operate with many projector configurations. Embodiments of the present disclosure can be used with these and other calibration and playback processes.

FIG. 1 shows a multi-projector display system 100 according to some embodiments. System 100 includes four projectors 102A-102D aimed at a display surface 104. Of course, other numbers of projectors 102 can be employed. Data is provided to projectors 102 by a projector platform 106, which can obtain source input from a media player 108, a computer 110, a source connected by a network 112 such as the Internet, and the like. For calibration, system 100 includes a digital still camera 114.

In one embodiment, system 100 includes four projectors 102 and projector platform 106 is implemented as a personal computer (PC) configured with a central processing unit (CPU) and graphic processing units (GPU) providing four video outputs each connected to one of projectors 102. An optional capture card provides video input from sources such as computer 110, media player 108, and the like. Digital still camera 114 is attached to projector platform 106 for the calibration process. In other embodiments, a video camera may be used for the calibration process. After calibration, digital still camera 114 may be removed or used as a media input device by projector platform 106.

Projectors 102A-102D produce respective component projections 120A-120D upon display surface 104. Together component projections 120A-120D form a single composite projection 122. Note that component projections 120 overlap in regions 124A-124C, which are referred to herein as "overlap regions."

Now a calibration process is described for system 100 of FIG. 1. If projection surfaces were all perfectly flat and projectors could output perfect rectangular displays level with a horizontal and vertical axis, then building large screens would be a much simpler task. Unfortunately, there is no limit to the ways a set of video projectors may be positioned and configured to project onto a surface. Placement angles relative to the surface, surface geometry, device orientation/rotation, lens distortion, and amount of overlapping projection area are just some of the variables affecting alignment of projector output and smoothness of the resulting display.

In addition to alignment and projected shape, color of the output from a single projector is affected by many variables. Projector technology, light source, lens, projection surface attributes and geometry, projector distance, and ambient light levels are examples. In addition, user configurations and settings within a projector can impact such variables as the dynamic range, color temperature, resolution, orientation, and signal tracking/pixel positions.

Figure 2:
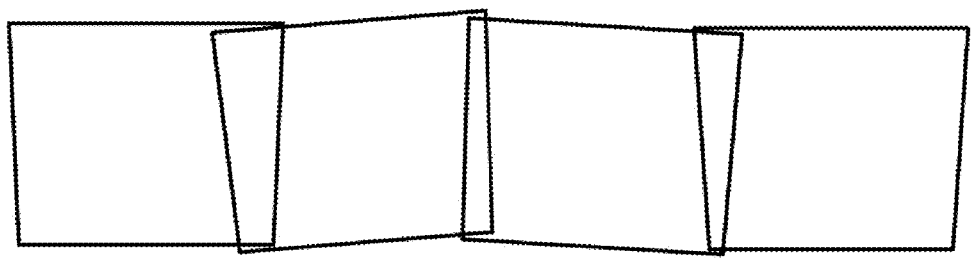
FIG. 2 shows an example of the output from the projectors of FIG. 1 on a display surface.

FIG. 2 shows an example of the output from projectors 102 of FIG. 1 on display surface 104. Notice that the projection rectangles are distorted. The orientation of each is also not aligned to a horizontal or vertical axis. These problems occur for several reasons including misalignment of the projector's lens plane to that of the target surface plane. Also notice the inconsistent shapes of the overlapping regions where two or more projectors are contributing and mixing pixel light on the display surface. Even perfectly undistorted rectangles will suffer from bright banding in these overlapping regions.

To create a seamless composite display, the calibration process computes the data needed to correct for the previously mentioned issues and other deficiencies common to the setup of multiple projector displays. By defining a viewpoint with which to align a virtual display region over the set of projections, a pixel mapping alignment and color blending measurement can be associated with each device pixel to create a composite seamless display.

The calibration process defines all pixels that make up the coordinate system of the composite display. Individual pixels in each projector's output projection are a potential contribution source to each pixel of the composite display. Thus, the output of each video projector must be examined carefully so that every device pixel can be identified and properly controlled to build the pixels of the composite display.

In system 100 of FIG. 1, camera 114 is used to examine the projections of projectors 102 both individually and as a group. Camera 114 is positioned to view the entire projection surface 104 and is thus the visual reference point for the calibration operation. Calibration operations affecting the shape of the target composite display are affected by the perspective from this camera viewpoint.

The physical size of the resulting composite display is determined by the count of projectors and the surface area occupied by the union of all projections. Projector pixel resolution determines the potential for composite display resolution. However, it is the resolution of the camera frame that determines the precision of pixel examination. Therefore, the camera frame defines the virtual pixel coordinate system of a virtual display space. This camera coordinate system is used throughout the calibration process. Calibration thus attempts to compute the mappings between projector device pixels and camera frame pixels. For example, assuming a camera frame resolution of 3000×2000, the virtual display has a coordinate system from (0,0) to (2999,1999). However, display can only occur within regions occupied by projector pixels. Therefore, an example bounded composite display region might have coordinates (300,400) to (2800,850).

FIGS. 3-6 demonstrate some possible display configurations incorporating as many as four projector devices. In each of FIGS. 3-6, the component projections are shown as solid lines, while the maximum display area of the composite projection is shown as a broken line. FIGS. 3 and 4 show composite projections formed by horizontal and vertical groupings, respectively, of component projections. FIG. 5 shows a composite projection formed by a 2×2 array of projections. FIG. 6 shows a "super-bright" composite projection formed by almost completely overlapping the component projections.

Each composite projection represents an ideal virtual display formed by the respective set of overlapping component projections. The composite projections are bounded composite regions defining a seamless screen area in which content can be displayed provided a pixel mapping between the regions' pixels and each projector device pixel can be determined.

Note that projector placement and position is not restrained. Landscape or portrait orientations, as well as variations in vertical or horizontal alignments, are freely supported. Keystone effects or other deformations of the projection rectangles caused by the angles between projection lens planes and the display surface do not change the resulting calibration technique according to this view of the target display surface.

The result of the calibration process is a calibration dataset. This calibration dataset contains all the information used by projector platform 106 to enable real-time pixel-level control over the data output by each video projector 102. The resulting pixel-adjusted output produces a composite display across the set of all projectors 102, including corrections made in many areas including individual projector registration, color matching, blending, black point, correlation, and display surface geometry.

Calibration begins with an initialization process that detects the presence and availability of all necessary devices required to complete the process. The display and resolution of each video projector 102 is enumerated within the graphics hardware. Camera 114 is also located and its operation verified. Other validity checks may be performed to ensure system functionality.

During this step, an identification and test pattern image can be projected by each projector 102. The output provides an attending user with feedback as to the detection results. Additionally, the pattern can be used to aide desired manual operations including adjustment of each projection's focus, verification of input signal and resolution, manual alignment adjustments, lens zooming, or other pre-calibration modifications.

It is generally undesirable to have gaps between projections on display surface 104. Therefore, though not required, each video projector 102 should be positioned in an orientation than overlaps some of its projection output with the output of neighboring video projectors 102. Overlapping regions allow for smoother blending of color variations and dynamic range between devices and ensure no gaps appear in pixel registration (that is, alignment). Grid test patterns are useful to equally distribute the overlap regions among projectors 102 and affect placement of the devices.

Projector platform 106 offers many calibration and configuration choices. Selection of one choice over another may offer advantages in calibration performance or calibrated quality, and each may have different setup requirements. Selection may depend upon platform capabilities, available precision, desired playback results, and the like.

In some embodiments, a performance choice is offered for simple geometric environments (for example such as flat wall displays). This choice is best used with fewer projectors 102 having limited misalignment or distortion. In other embodiments, a quality choice is available to enable calibration within complex geometric environments (for example employing curved or irregular surfaces). In other embodiments, the default target result changes from a selection of a seamless display composed from the union of the set of projectors 102 (for example, to produce a large array display region), to only an intersection of the set of projectors 102 (for example, to produce a super-bright display region), or some complex combination of the two. In a super-bright calibration, overlapping regions are not reduced in brightness to match with non-overlapping regions. Instead, the seamless composite display is positioned only within the overlapped zone so that each projector pixel can additively combine its light to produce a brighter view of a scene.

A user interface can be provided to allow users to select the calibration type. The type requested can be referenced to signal use of an appropriate calibration technology. In other embodiments, the choice of calibration type is determined automatically by an analysis of preview images. Projector orientation, placement, and overlap help determine the intended calibration result.

In some embodiments, a fast and simple flat-wall calibration process uses interpolation and homography to align the geometries of each projector's output. In other embodiments, a more exacting method uses special gray-code test patterns to extract pixel-level location information for alignment on complex surfaces or among severely misaligned projectors.

Calibration requires the use of a camera 114 to capture special calibration test patterns from each projector 102. To ensure that camera 114 has an adequate view of the projection surface 104, a user interface is offered in some embodiments to preview the camera viewpoint. Provided camera controls and display patterns may be manipulated to verify camera acquisition and aide repositioning/placement of the camera viewpoint prior to the calibration capture process. The user interface can be used to help align and position camera 114 prior to the start of calibration. Updating of the preview image may be provided automatically or by user-interface button controls. Thus, as the physical view location of camera 114 is modified, a preview of its captured images is shown in a display window. This preview is useful for adjusting camera focus to ensure accurate capture results. Alignment grid tools may be available so that the perspective of projection surface 104 can be horizontally or vertically optimized for better results. Ensuring that the complete projection surface display is within view may require physical camera movement or possible zoom setting, which can also be provided by the user interface. Various test patterns may be displayed by projectors 102 to ensure projector views are visible.

Camera exposure is important to the success of the calibration process. Light intensity can vary dramatically among different display surface locations a given projection display, for example due to ambient lighting conditions, light fall-off, screen material, polarization, rear-projection hot-spots, internal filters, lamp age, and other variables. Different color channels may require different exposure settings. Projector resolution, orientation, and device technology may result in line patterns drawn vertically requiring more exposure than those drawn horizontally.

In some embodiments, different exposures can be set for use by each element of the calibration capture process. These embodiments may provide user controls to aide in pre-setting the exposure at each state by using test patterns and measurement within camera preview images of said test patterns.

In other embodiments, an automatic or aided detection of projection locations is determined from preview images. Projector platform 106 then prepares the set of exposure values for each element using a small picture taking and measurement process to ensure valid exposure latitude.

The capture process includes projecting specialized calibration patterns (images) with each projector 102. Calibration camera 114 captures a frame for each displayed image and stores the result for later processing. Storage includes maintaining a set of captured images associated with each projector 102. Some images displayed simultaneously on all projectors 102 are stored in a separate overlap folder. For some specialized calibration patterns, several frames may be captured at various exposure settings. Ambient light levels are also captured to aid specific calibration processing steps. The count and type of calibration patterns chosen depend upon the calibration type selected.

In some embodiments, a precision calibration utilizes gray-code sequences that have specialized calibration patterns including raster lines drawn at known pixel densities in horizontal and vertical directions and alternating color segments. In other embodiments, specialized calibration patterns include color patches at known requested RGB output values. These patches are used by the calibration processing to balance the color range and gamut across the set of projectors 102. In still other embodiments, a performance calibration may be used for flat-wall calibrations. In yet other embodiments, a super-bright sequence can be either precision-based or performance-based. Since color calibration among projectors 102 is not required for this calibration type, various specialized patterns are not needed.

Tables 1-4 illustrate sample lists of specialized sets of calibration pattern sequences used for various calibration types. Each calibration pattern label represents one or a set of image calibration pattern images that are captured in the sequence listed. Exposure settings may be different for each new sequence utilized. Table 1 presents a sample list of calibration pattern sequences for a Super-Bright calibration type. Table 2 presents a sample list of calibration pattern sequences for a Super-Bright Precision calibration type. Table 3 presents a sample list of calibration pattern sequences for a performance calibration type. Table 4 presents a sample list of calibration pattern sequences for a precision calibration type.

TABLE 1

| Super-Bright |
|---|
| RED_IMAGE |
| GREEN_IMAGE |
| BLUE_IMAGE |
| AMBIENT_IMAGE |
| HOMOGRAPHY_IMAGE |

TABLE 2

| Super-Bright Precision |
|---|
| RED_IMAGE |
| GREEN_IMAGE |
| BLUE_IMAGE |
| AMBIENT_IMAGE |
| AMBIENT_IMAGE_RED |
| AMBIENT_IMAGE_GREEN |
| AMBIENT_IMAGE_BLUE |
| AMBIENT_IMAGE_GRAY |
| AMBIENT_IMAGE_RASTER_ROWS |
| AMBIENT_IMAGE_RASTER_COLUMNS |
| GRAY_IMAGE |
| RASTER_IMAGE_ROWS |
| RASTER_IMAGE_COLUMNS |
| RASTER_IMAGE_BOX |

TABLE 3

| Performance |
|---|
| WHITE_IMAGE |
| GRAYSCALE_IMAGE |
| REDSCALE_IMAGE |
| GREENSCALE_IMAGE |
| BLUESCALE_IMAGE |
| RED_IMAGE |
| GREEN_IMAGE |

TABLE 3-continued

| Performance |
|---|
| BLUE_IMAGE |
| AMBIENT_IMAGE |
| HOMOGRAPHY_IMAGE |

TABLE 4

| Precision |
|---|
| WHITE_IMAGE |
| GRAYSCALE_IMAGE |
| REDSCALE_IMAGE |
| GREENSCALE_IMAGE |
| BLUESCALE_IMAGE |
| RED_IMAGE |
| GREEN_IMAGE |
| BLUE_IMAGE |
| AMBIENT_IMAGE |
| AMBIENT_IMAGE_RED |
| AMBIENT_IMAGE_GREEN |
| AMBIENT_IMAGE_BLUE |
| AMBIENT_IMAGE_GRAY |
| AMBIENT_IMAGE_RASTER_ROWS |
| AMBIENT_IMAGE_RASTER_COLUMNS |
| GRAY_IMAGE |
| RASTER_IMAGE_ROWS |
| RASTER_IMAGE_COLUMNS |
| RASTER_IMAGE_BOX |

Calibration processing relies on the selected calibration type and the camera frames generated by the capture process. It includes several image and data processing steps that ultimately compose a calibration dataset defining the seamless unified display. This CPU and data intensive process requires no user interaction. The calibration includes the steps described below.

Detect Display Regions—This step identifies the location of each projector's projection area within the camera frame. Virtual camera coordinates containing each component projection are calculated.

Crop and Mask—To reduce image processing time and prepare data for future image processing operations, each captured camera frame is cropped/masked according to the calculated camera coordinates of the associated projector(s) 102.

Compute Coordinate Mappings—Several steps are involved in measuring and detecting the exact pixel location for each projector pixel. Depending upon configuration, several camera coordinates may be assigned to the same projector pixel, in which case averaging is applied at runtime. This process can vary depending upon the calibration type chosen. A separate pixel mapping table, referred to herein as a "view projection matrix," is provided for each projector 102.

Prepare Intensity scaling maps—This process begins with identification of overlapping, non-overlapping, and out of bounds projection regions. Intensity scaling maps are generated for the overlapping projection regions to aide projector platform 106 with pixel blending requirements. Various embodiments are described in detail below.

Generate Color Curves—This last step measures captured color patches and generates appropriate look-up tables to adjust color variance among the separate projectors 102.

The final output of the calibration process is a complete calibration dataset stored for use by projector platform 106. This dataset defines information regarding each projector's mapping to the virtual unified display, as well as cross data information concerning adjustments required for a given projector 102 based upon measured findings of other projectors 102, for example, to balance color brightness across all projectors 102.

Projection playback employs the calibration dataset prepared by the calibration process, access to a high-performance GPU, and media content to display. For each projector 102, projector platform 106 creates a virtual screen frame buffer at the size computed for the bounded composite display. Additionally, the view projection matrix and color blending elements are loaded as appropriate from the calibration dataset associated with each projector 102. Portions of the calibration data set are converted and stored into texture elements provided to GPUs for input to custom fragment-shader and vertex-shader modules, which are also loaded and compiled by projector platform 106. In one embodiment, OpenGL and the OpenGL Shading Language (GLSL) are used to define the fragment modules used by projector platform 106. Projector platform 106 can include the elements listed below.

GPU Playback Manager—For each display frame time, the GPU Playback Manager manages the drawing interface between media drawers and the GPU. The GPU Playback Manager provides the initialization interface to compile and load various shaders, texture elements, and memory mapped performance buffers. The main frame drawing loop that passes variables to the shaders for processing is managed by this module.

User-Interface Layout Controller—The projection playback module offers a set of user-interface controls to adjust various settings including the layout of media drawers within the system. Configuration options and media selections are stored and loaded via configuration scripts and playlists.

Media Drawers—For different types of media input sources, a media drawer module is constructed for loading and advancing the specific media data content. In one embodiment, media drawers include a movie content drawer, an image file drawer, a capture card drawer, and various test pattern drawers. The role of the media drawer is to prepare frames of appropriate data for use by each projector instance during a frame advance/refresh process. This data is drawn into the virtual frame buffers which are then forwarded to the GPU for final device rendering.

Virtual Frame Buffers—A single large frame buffer holds the main display elements. Portions of this buffer are copied to projector specific instances prior to rendering of each projector display by the GPU.

Now the generation of intensity scaling maps is described in detail. The intensity scaling maps are used to blend the outputs of multiple projectors upon a single display surface so a viewer is not aware the display is created by multiple projectors.

As mentioned above, the first step of the calibration process is to set up the field of view of camera 114 to capture the output of all of projectors 102. A calibration program then displays a number of images on each projector 102 that are captured with camera 114. These images are processed to create the view projection matrices, which contain mappings of each projector pixel to each camera pixel. In some cases, the mappings are 1:1. In other cases, other mappings apply. For example, multiple camera pixels can map to each projector pixel. This information is used by projector platform 106 to transform the input data so that the composite projection generated by multiple projectors 102 is corrected to the perspective of camera 114. This approach has the advantage of correcting for irregular surfaces and projector placement. In addition to the camera to projector pixel mapping, each camera pixel has an intensity scaling value defined as a floating point number. This intensity scaling value is calculated during the process of creating the intensity scaling maps to give projector platform 106 the information needed to create a smooth transition when blending the outputs of two projectors 102.

Figure 7:
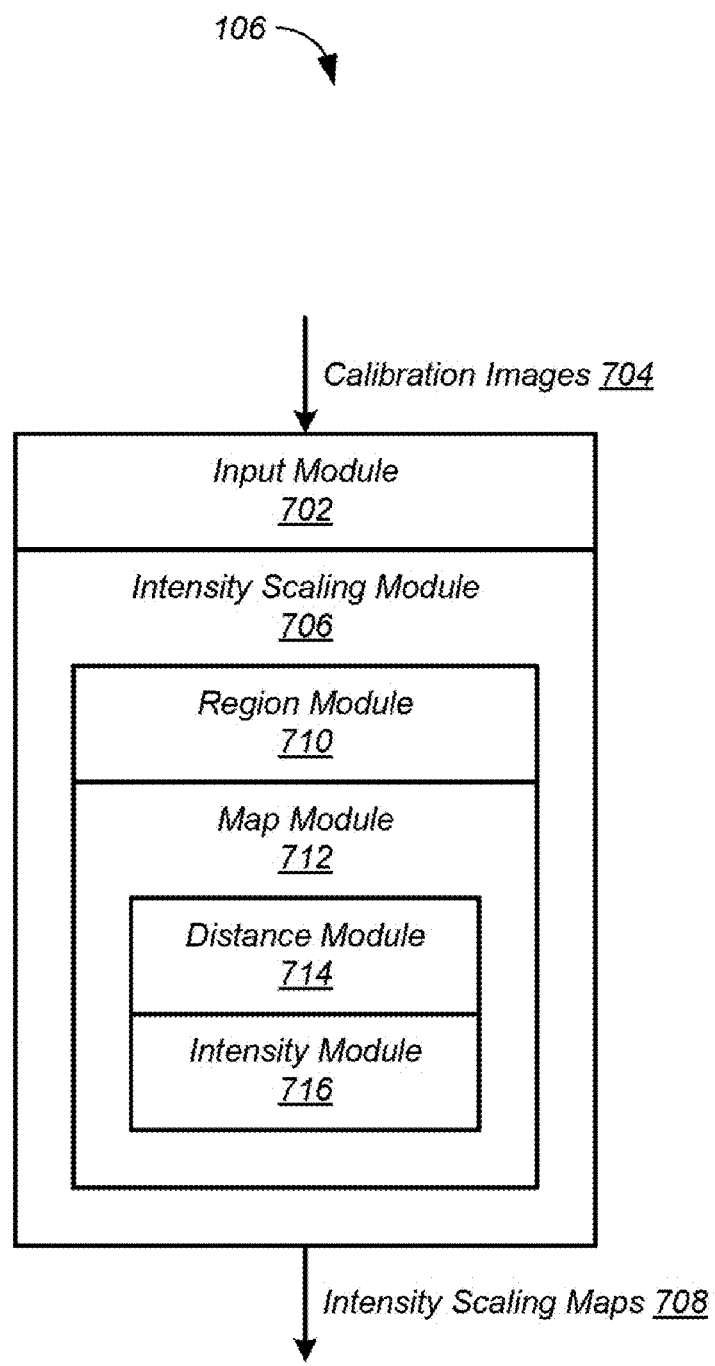
FIG. 7 shows elements of the projector platform of FIG. 1 for generating intensity scaling maps according to some embodiments.

FIG. 7 shows elements of projector platform 106 of FIG. 1 for generating intensity scaling maps according to some embodiments. Although in the described embodiments, apparatus elements are presented in one arrangement, other embodiments may feature other arrangements, as will be apparent to one skilled in the relevant arts based on the disclosure and teachings provided herein. For example, the apparatus elements can be implemented in hardware, software, or combinations thereof.

Referring to FIG. 7, projector platform 106 includes an input module 702 adapted to receive captured calibration images 704 from camera 114 and an intensity scaling module 706 adapted to generate intensity scaling maps 708 based on calibration images 704. Intensity scaling module 706 includes a region module 710 and a map module 712. Map module 712 includes a distance module 714 and an intensity module 716.

Figure 8:
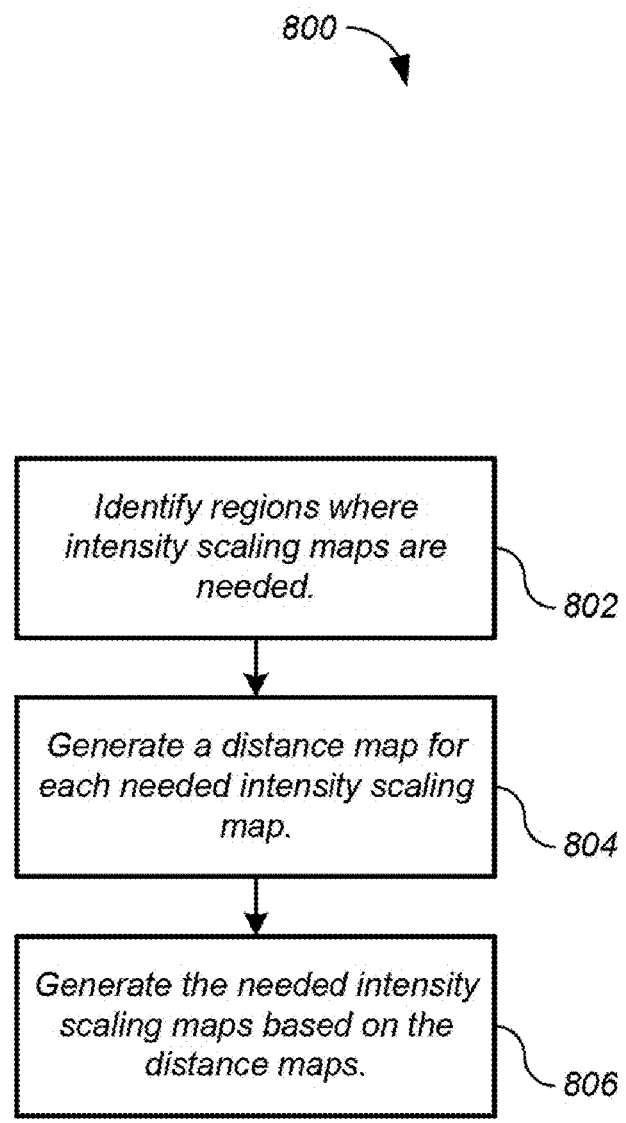
FIG. 8 shows a process for the projector platform of FIG. 7 for generating intensity scaling maps according to some embodiments.

FIG. 8 shows a process 800 for projector platform 106 of FIG. 7 for generating intensity scaling maps according to some embodiments. Although in the described embodiments, the elements of the processes disclosed herein are presented in one arrangement, other embodiments may feature other arrangements, as will be apparent to one skilled in the relevant arts based on the disclosure and teachings provided herein. For example, in various embodiments, some or all of the steps of the disclosed processes can be executed in a different order, concurrently, and the like. Referring to FIG. 8, process 800 begins with identifying regions where intensity scaling maps are needed (step 802).

Figure 9:
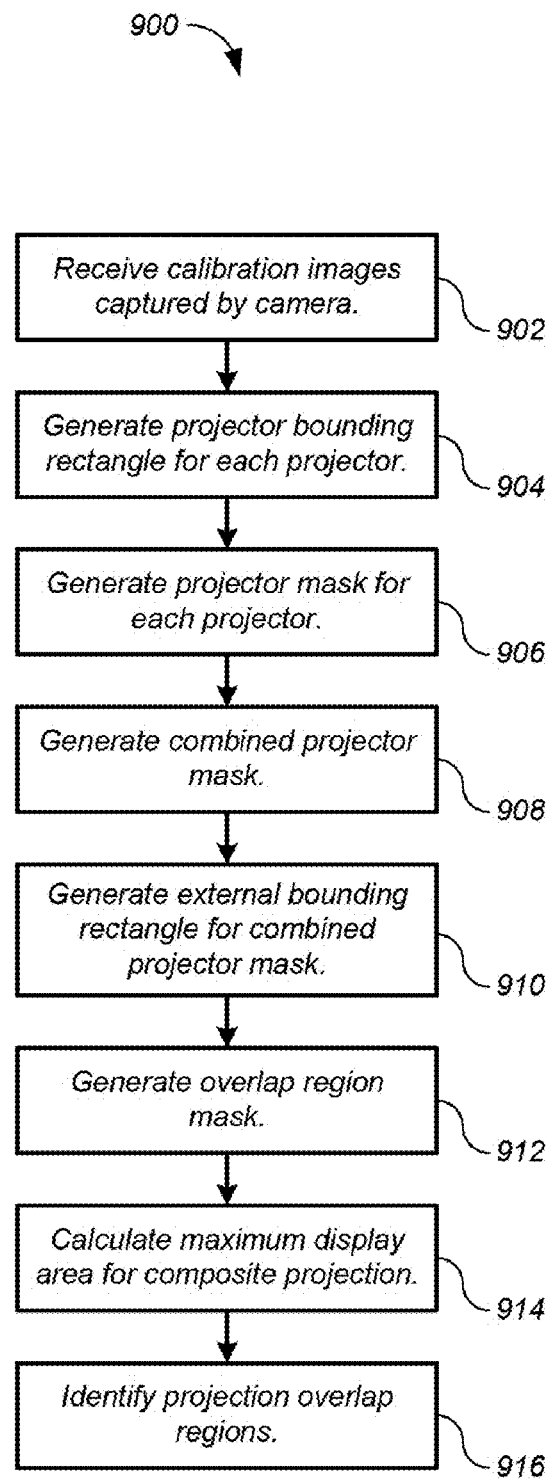
FIG. 9 shows a process for the projector platform of FIG. 7 for identifying regions where intensity scaling maps are needed according to some embodiments.

FIG. 9 shows a process 900 for projector platform 106 of FIG. 7 for identifying regions where intensity scaling maps are needed according to some embodiments. Referring to FIG. 9, process 900 begins with the receipt by input module 702 of calibration images 704 captured by camera 114 (step 902). Based on calibration images 704, intensity scaling module 706 also generates, for each projector 102, a projector bounding rectangle (step 904). Each projector bounding rectangle is a rectangle, aligned with the virtual display space, that contains the respective component projection 120 of the respective projector 102.

Figure 10:
FIG. 10 shows an example combined projector mask for four projectors arranged in a horizontal row.

Intensity scaling module 706 also generates, for each projector 102, a projector mask (step 906). Each projector mask identifies the region in the virtual display space occupied by the component projection of the respective projector 102. Intensity scaling module 706 then generates a combined projector mask by combining the individual projector masks (step 908). FIG. 10 shows an example combined projector mask for four projectors 102 arranged in a horizontal row.

Figure 11:
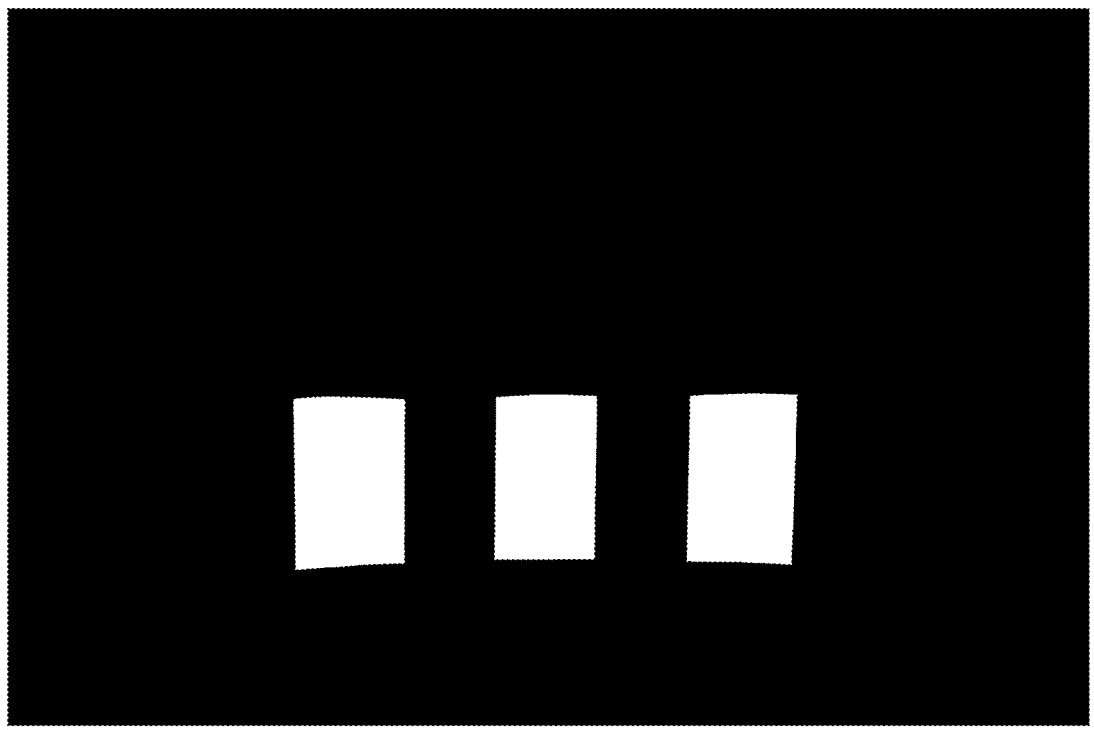
FIG. 11 shows the overlap region mask, having three overlap regions, for the example of FIG. 10.

Intensity scaling module 706 then generates an external bounding rectangle for the combined projector mask (step 910). For example, a connected components technique, with a minimum region size of 20, can be employed to generate the external bounding rectangle. Intensity scaling module 706 also generates an overlap region mask that identifies the regions where the component projections overlap (step 912). FIG. 11 shows the overlap region mask, having three overlap regions, for the example of FIG. 10.

Figure 12:
FIG. 12 shows the maximum display area for the example of FIG. 10.

Intensity scaling module 706 also calculates the maximum display area for the composite projection (step 914). The maximum display area is calculated as the largest rectangle, aligned with the virtual display space, that can fit inside the combined projector mask. The maximum display area defines the largest area that can be used to display an image using multiple projectors. FIG. 12 shows the maximum display area for the example of FIG. 10. Also recall that example maximum display areas for different composite projections are shown as broken lines in FIGS. 3-6.

Next intensity scaling module 706 identifies projection overlap regions (step 916). An intensity scaling map will be created for each projection overlap region. To identify the projection overlap regions, a mask is created using the rectangle coordinates for the maximum display area. For each projector 102, the respective projector mask is added to the projector mask of a different projector 102. This resulting mask is thresholded with a value greater than one, yielding the overlap regions, if any, between the two projectors 102. If there are any pixels in the new mask with a value of one, the two projectors 102 have overlapping projections, thus requiring the creation of one or more intensity scaling maps. This process is repeated for each combination of two projectors 102. An n×n intersect matrix can be used to keep track of which projectors 102 have been processed.

Figure 13A:
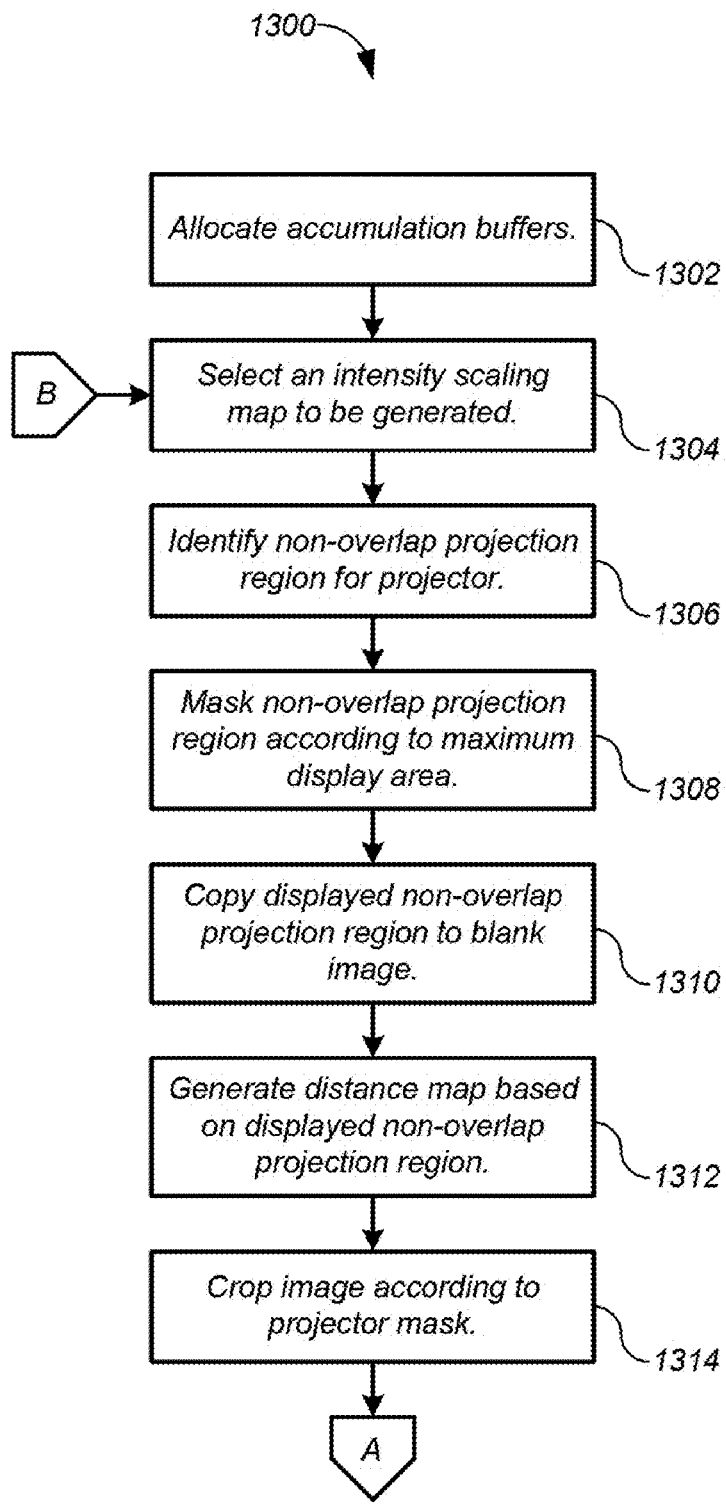
FIGS. 13A-B show a process for the projector platform of FIG. 7 for generating a distance map for each needed intensity scaling map according to some embodiments.
Figure 13B:
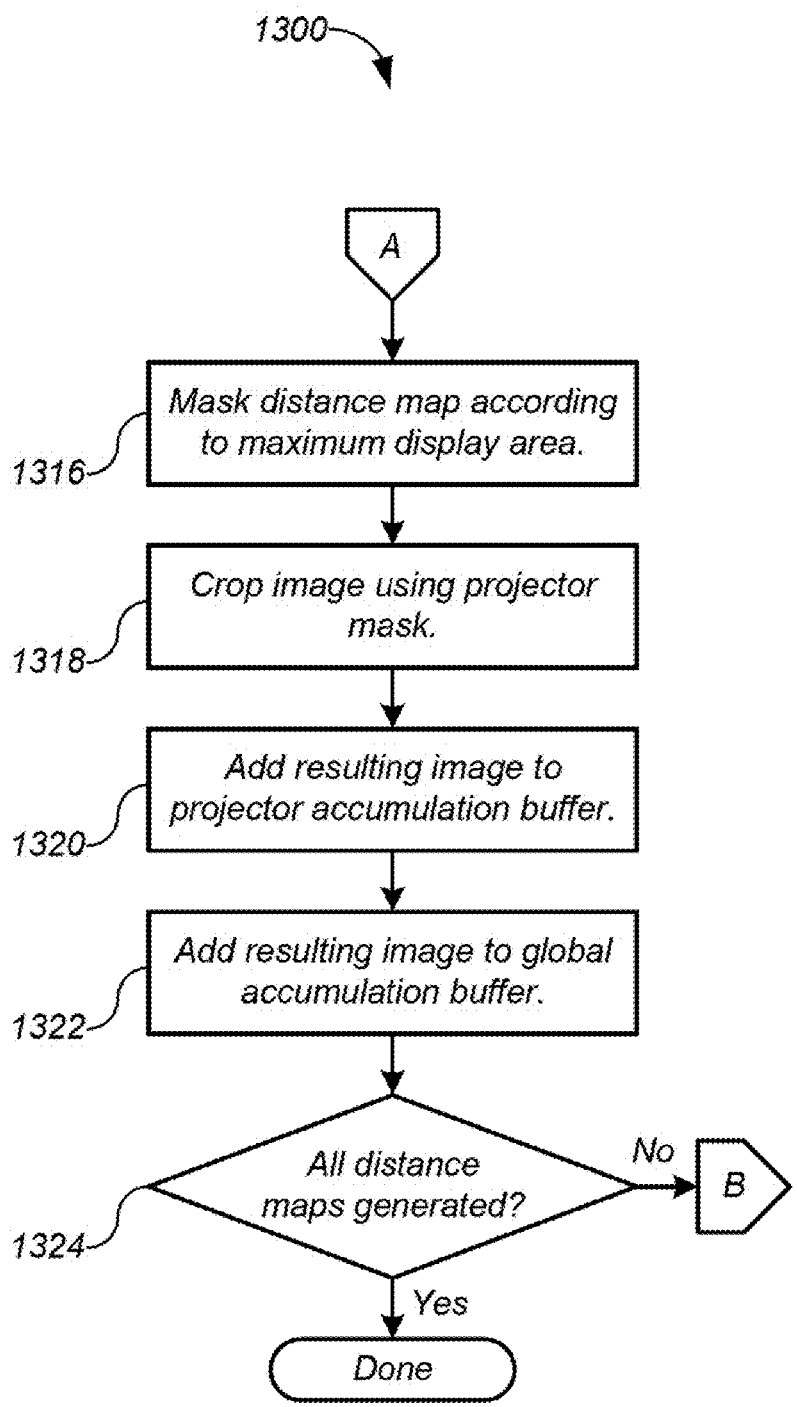

Referring again to FIG. 8, after identifying regions where intensity scaling maps are needed (step 802), process 800 generates a distance map for each needed intensity scaling map (step 804). FIGS. 13A-B show a process 1300 for projector platform 106 of FIG. 7 for generating a distance map for each needed intensity scaling map according to some embodiments.

Referring to FIGS. 13A-B, intensity scaling module 706 allocates a plurality of accumulation buffers (step 1302). Intensity scaling module 706 allocates a global accumulation buffer having the same size as the virtual display space (that is, the same size as the camera frame). Intensity scaling module 706 also allocates a respective projector accumulation buffer for each projector 102.

Each needed intensity scaling map is processed individually. Therefore, region module 710 selects one of the intensity scaling maps to be generated (step 1304). Region module 710 then identifies the displayed non-overlap projection region for the projector 102 associated with the selected intensity scaling map. The displayed non-overlap projection region is that portion of the respective component projection that is within the maximum display area of the composite projection, but does not overlap with any other component projection.

Figure 14:
FIG. 14 shows the non-overlap projection region for the left-most projector in the example of FIG. 10.
Figure 15:
FIG. 15 shows the displayed non-overlap projection region for the projector in the example of FIG. 11.

To identify the displayed non-overlap projection region, region module 710 first identifies the non-overlap projection region for the projector 102 (step 1306). To identify the non-overlap projection region, region module 710 combines the respective projector mask with the overlap region mask, for example using an exclusive-or (XOR) operation. FIG. 14 shows the non-overlap projection region for the left-most projector 102 in the example of FIG. 10. Then region module 710 masks the non-overlap projection region according to the maximum display area (step 1308). This step removes artifacts that would be visible outside the maximum display area. FIG. 15 shows the displayed non-overlap projection region for the projector 102 in the example of FIG. 11. The displayed non-overlap projection region is passed to map module 712.

To reduce memory consumption in the following steps, distance module 714 uses the respective projector bounding rectangle to copy the displayed non-overlap projection region to a blank image (step 1310). The blank image can be a rectangular image, where the short side of the rectangle is at least twice as long as the long side of the bounding rectangle. For example, the blank image can be a square image N times larger than the largest dimension of the cropped projector image. N can be selected according to memory requirements, but should be large enough to prevent distortion in the ensuing calculations. In some embodiments, N=3.

Figure 16:
FIG. 16 shows an example distance map for the projector in the example of FIG. 11.

Distance module 714 then generates a distance map based on the displayed non-overlap projection region in the rectangular image (step 1312). In particular, distance module 714 determines the distance to the nearest pixel within the displayed non-overlap region of the projector 102 for each pixel outside the non-overlap region of the projector. This calculation is done in the blank image to avoid distortion that arises in the corners of displayed non-overlap region when one edge of displayed non-overlap region is too close to a white pixel body. Each distance is stored in the respective pixel. Distance module 714 then crops the image according to the respective projector bounding rectangle (step 1314). FIG. 16 shows an example distance map for the projector 102 in the example of FIG. 11.

Figure 17:
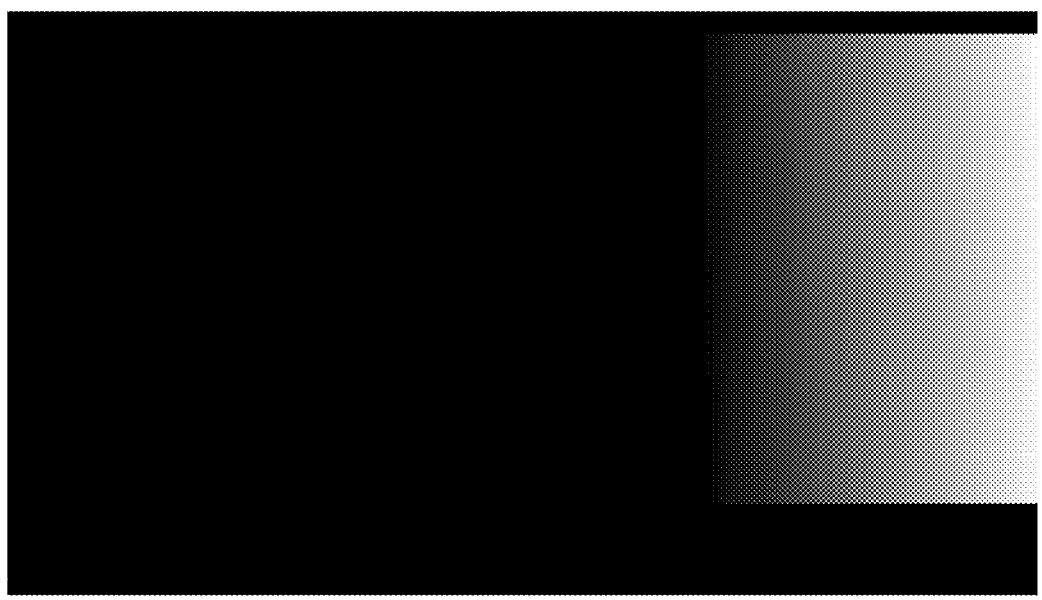
FIG. 17 shows the masked distance map for the distance map of FIG. 16.
Figure 18:
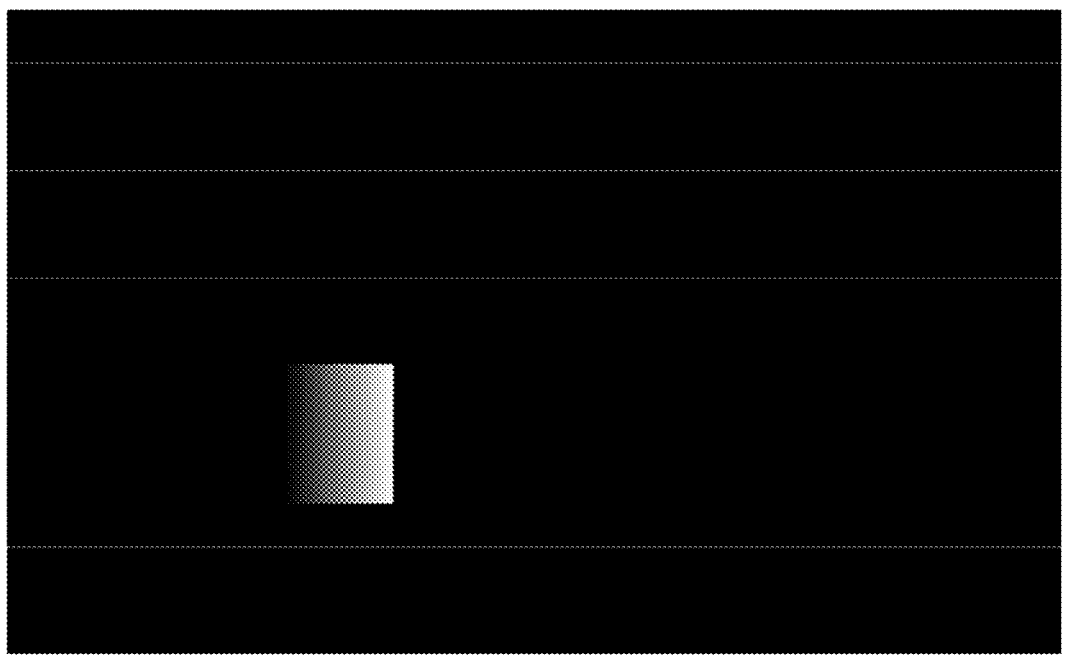
FIG. 18 shows an example of the global accumulation buffer after the addition of the masked distance map of FIG. 17.

Distance module 714 then masks the distance map according to the maximum display area (step 1316). FIG. 17 shows the masked distance map for the distance map of FIG. 16. Distance module 714 then crops the image according to the respective component projection, that is, using the respective projector bounding rectangle (step 1318). Distance module 714 adds the resulting image to the respective projector accumulation buffer (step 1320). Distance module 714 also adds the resulting image to the global accumulation buffer (step 1322). FIG. 18 shows an example of the global accumulation buffer after the addition of the masked distance map of FIG. 17.

Figure 19:
FIG. 19 shows an example of the global accumulation buffer of FIG. 17 after the addition of a second masked distance map.
Figure 20:
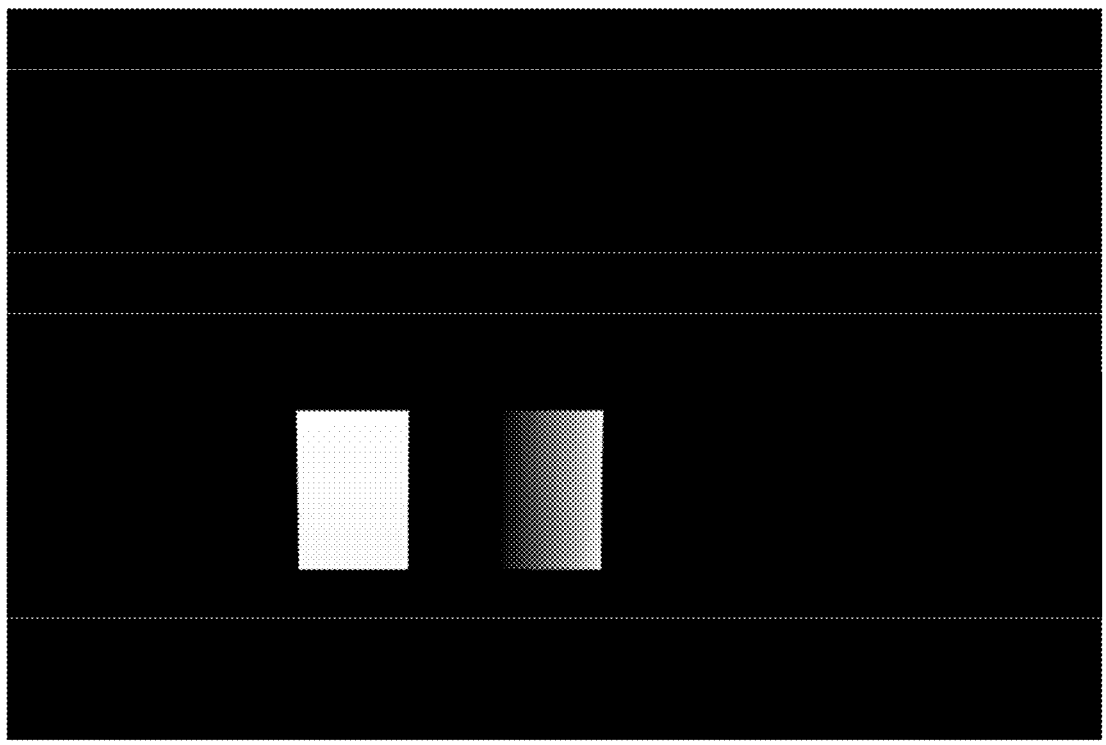
FIG. 20 shows an example of the global accumulation buffer of FIG. 18 after the addition of a third masked distance map.

Process 1300 repeats until a distance map has been generated for each needed intensity scaling map (step 1324). FIG. 19 shows an example of the global accumulation buffer of FIG. 17 after the addition of a second masked distance map. FIG. 20 shows an example of the global accumulation buffer of FIG. 18 after the addition of a third masked distance map.

Figure 21:
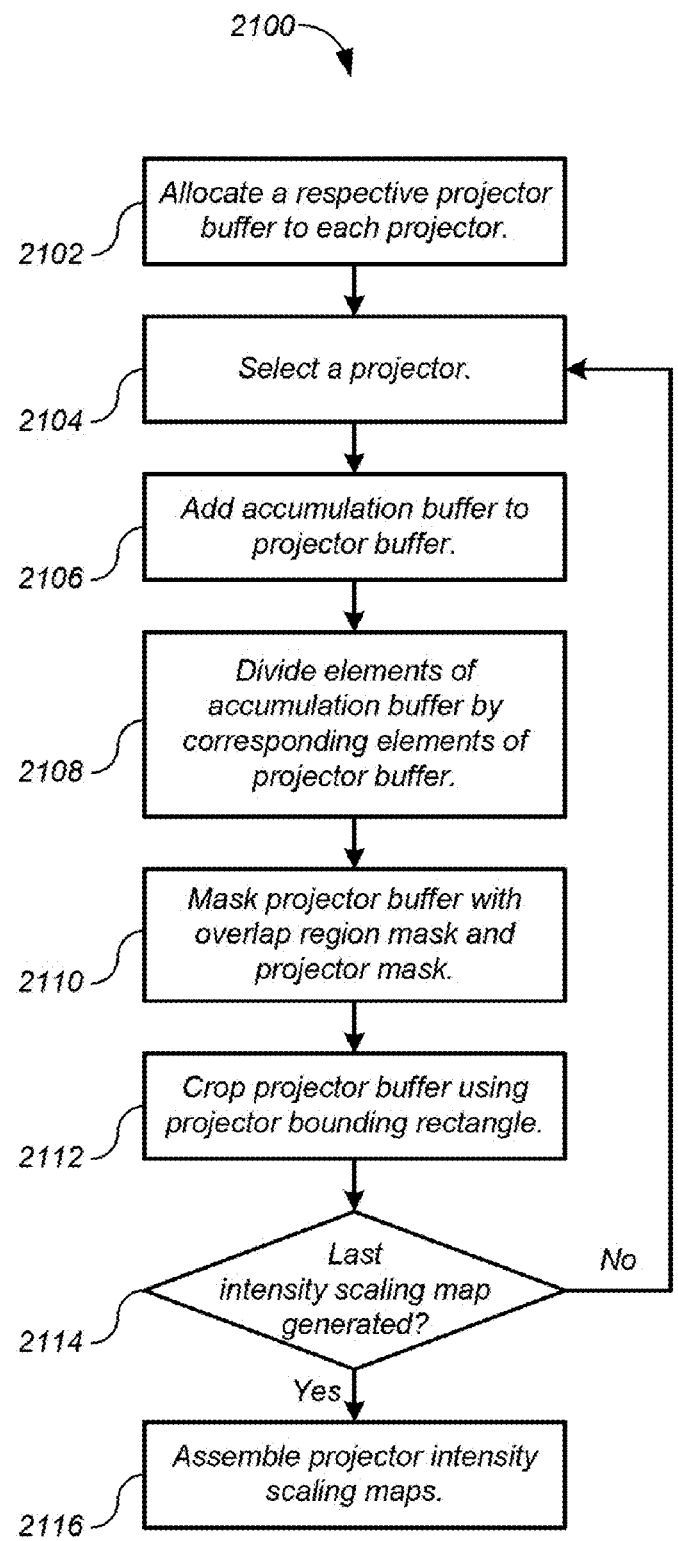
FIG. 21 shows a process for the projector platform of FIG. 7 for generating the needed intensity scaling maps based on the distance maps according to some embodiments.

Referring again to FIG. 8, after generating a distance map for each needed intensity scaling map (step 804), process 800 generates the needed intensity scaling maps based on the distance maps (step 806). FIG. 21 shows a process 2100 for projector platform 106 of FIG. 7 for generating the needed intensity scaling maps based on the distance maps according to some embodiments.

Referring to FIG. 21, intensity module 716 first allocates a respective projector buffer to each projector 102 (step 2102). Each projector buffer is the same size as the virtual display space. Each projector 102 is processed individually. Therefore, intensity module 716 selects one of projectors 102 (step 2104).

Next the accumulation buffer of the selected projector 102 is added to the projector buffer of the selected projector 102 in the position of the projector region of the selected projector 102 (step 2106). Then in the bounding rectangle enclosing the selected projector 102, each element of the projector buffer of the selected projector 102 is divided by the corresponding element of the global accumulation buffer (step 2108). This step balances overlapping intensity scaling maps because the final values become a percentage of their contribution to the sum of the original intensity scaling maps.

Figure 22:
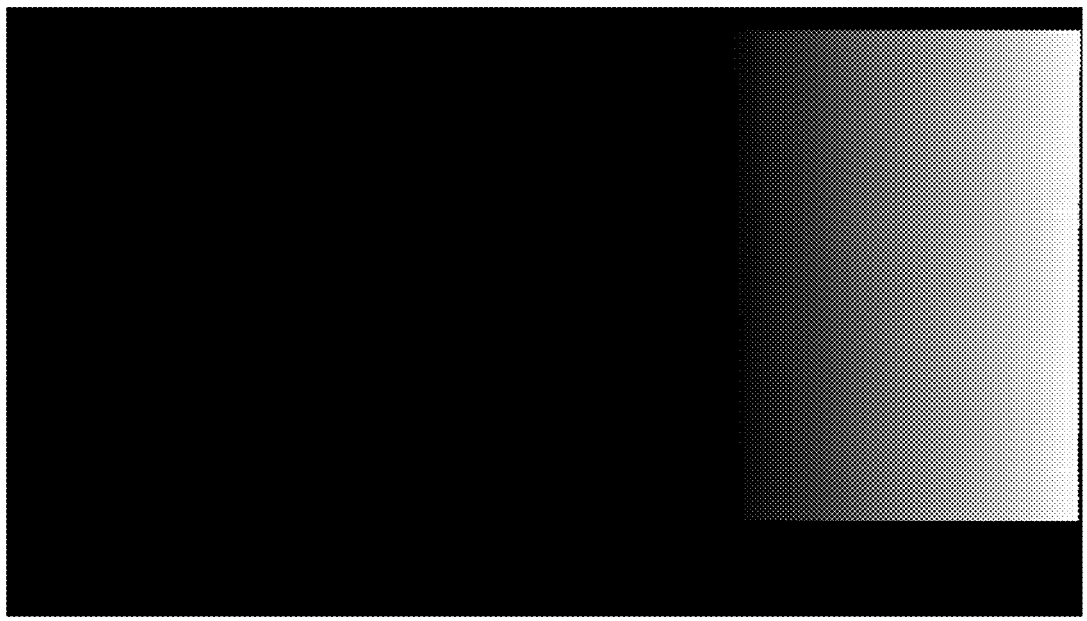
FIG. 22 shows the intensity scaling map for the distance map of FIG. 17.

Next the projector buffer is masked by the overlap region mask, and by the projector mask, of the selected projector 102 (step 2110). The projector buffer is then cropped using the projector bounding rectangle (step 2112), thereby generating the respective intensity scaling map. The intensity scaling map is then saved to a file. FIG. 22 shows the intensity scaling map for the distance map of FIG. 17. In FIG. 22, the intensity scaling values range between 0 and 1 depending on the distance from the non-overlap region of the selected projector 102. Process 2100 repeats until each needed intensity scaling map has been generated (step 2114).

Finally, a respective projector intensity scaling map is assembled for each projector 102 (step 2116). For each projector 102, the displayed non-overlap projection region (FIG. 15) for the projector 102 is combined with all of the intensity scaling maps for the projector 102 to form a single projector intensity scaling map. In each projector intensity scaling map, the intensity scaling values fall between 0 and 1 for the overlap region(s), and are 1 or greater for the non-overlap region.

Once the projector intensity scaling maps have been generated, they can be used to generate projections of images, video, and the like, for example as described above. Each projector 102 generates a component projection 120 based on an input image and the intensity scaling map(s) associated with that projector 102. The projector intensity scaling maps are used to adjust the intensities of component projections 120 to form a seamless composite projection 122. That is, each intensity scaling value in a projector intensity scaling map is used to scale the intensities of the corresponding image pixels before projection.

The techniques described above decrease pixel brightness by applying an intensity scaling value to each pixel in a projection overlap region 124. The perceived "smoothness" of the resulting brightness transitions is thus a function of the number of intensity scaling values that can be resolved across each projection overlap region 124 and the intensities of the source content pixel values being adjusted. With constantly changing and varied high frequency source content and luminance, the effect is pleasing to the eye. However, when the luminance of the source content is low, and particularly when large regions of the source content are a uniform color, a "stair-stepping" effect can be perceived.

Figure 23:
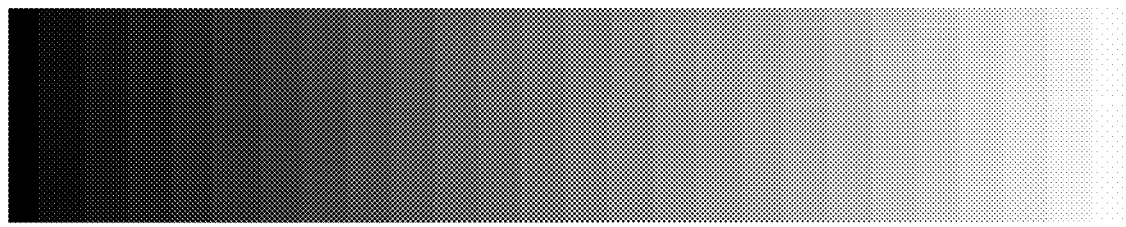
FIG. 23 shows a stair-step pattern visible when transitioning from black to white using only 26 possible transition values.

FIG. 23 shows a stair-step pattern visible when transitioning from black to white using only 26 possible transition values. The pattern is created because the change in brightness between each segment is too large a "step" and is quite noticeable to the eye. If the size of each segment were narrowed (for example to one pixel), this effect would be naturally diminished. If more possible transition values were available (for example, 255 possible transition values instead of 26), the effect would also be reduced.

Stair-step effects can be caused by many factors. The amount of change between transition points, the number of values that can divide that range, and the size of the transition region are all variables. For example, assume a solid bright color as source content filling the display. The brightness of the color in an overlap region is reduced using the intensity scaling values in the respective intensity scaling map. If there are many projector pixels in the projection overlap region 124, there can be many intensity scaling values computed close enough together to make a pleasing transition. However, if the source color is not very bright, the product of the color value and the intensity scaling value may reduce the range of possible RGB values that can be created and thus increase the "step" width. Or, if the projection overlap region 124 is narrow, the distance between adjoining intensity scaling values is increased, thus reducing the count of possible RGB values that will be represented.

Ideally, projection overlap regions 124 are wide enough to account for smooth intensity scaling. However, region size alone will not help eliminate a lack of dynamic range in source content color values. For example, if there are only 10 physical color values that can be represented, any region size larger than 10 units will produce stair-stepping. Compounding this trouble is that at low brightness levels, small changes in color luminance are more easily seen as compared to equal changes at higher brightness levels. This effect may be further exaggerated by gamma correction adjustments.

To reduce the stair-stepping, some embodiments employ a dithering approach.

Figure 24:
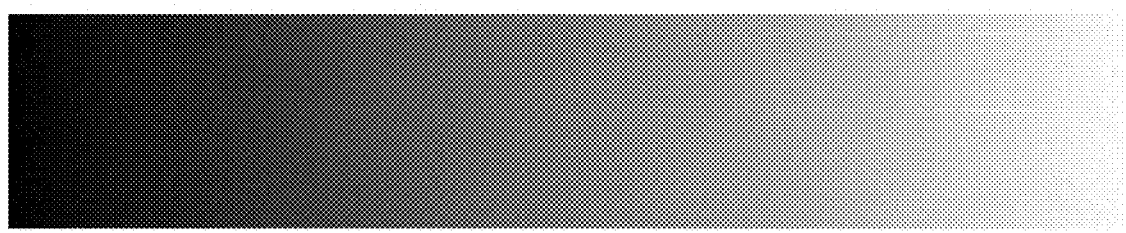
FIG. 24 shows the result of applying a dithering approach compared to FIG. 23.

FIG. 24 shows the result of applying this approach compared to FIG. 23. In FIG. 24, the intensity scaling values of the projector intensity scaling map have been dithered to break the stair-step pattern observed in FIG. 23.

According to various embodiments, for each projector intensity scaling map, which can be generated as described above, which for clarity are hereinafter referred to as "primary projector intensity scaling maps," a dithered projector intensity scaling map is generated. Projector platform 106 then generates a respective component projection image for each projector 102 based on the respective primary projector intensity scaling map, the respective dithered projector intensity scaling map, and intensity values of the source image. Each projector 102 then generates a component projection 120 based on the respective component projection image provided by projector platform 106. Together the component projections 120 form a composite projection 122 without noticeable stair-stepping effects in projection overlap regions 124.

The intensity scaling values in each dithered projector intensity scaling map are generated based on the intensity scaling values of the respective primary projector intensity scaling map. To generate an intensity scaling value of the dithered projector intensity scaling map, a pixel is selected from the dithered projector intensity scaling maps. Then a pixel is selected from the respective primary projector intensity scaling map based on the location of the pixel in the dithered projector intensity scaling map and one or more dimensions of the respective primary projector intensity scaling map. Then the intensity scaling value of the pixel selected from the respective primary projector intensity scaling map is assigned to the pixel selected from the dithered projector intensity scaling map. Various embodiments are described in detail below.

In some embodiments, the dithered intensity scaling maps are generated in real time, that is, after receiving a source image to be projected. FIGS. 30A-C show code for an example real-time implementation. In other embodiments, the dithered intensity scaling maps are pre-computed, as described now in detail.

Figure 25:
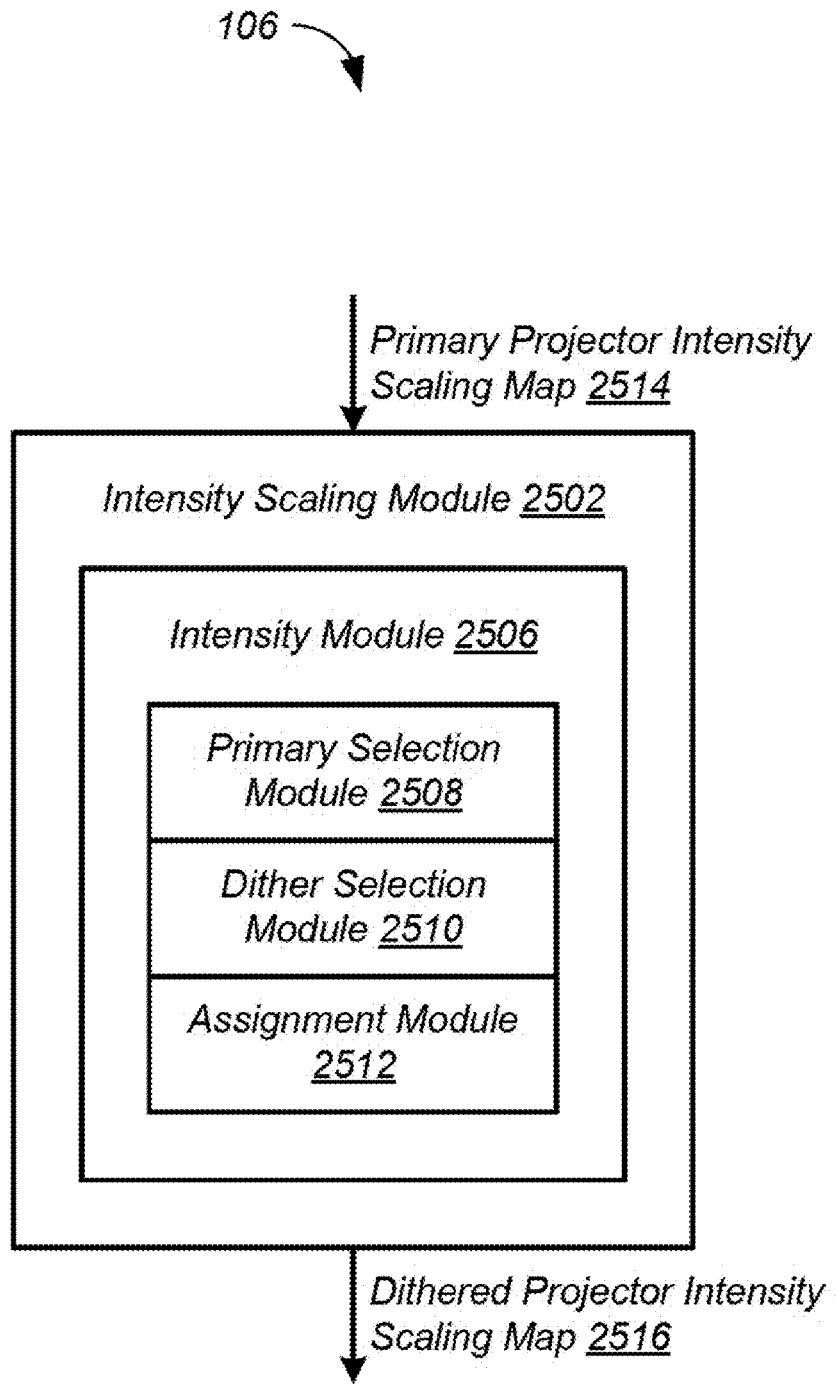
FIG. 25 shows elements of the projector platform of FIG. 1 for generating a dithered projector intensity scaling map according to some embodiments.

FIG. 25 shows elements of projector platform 106 of FIG. 1 for generating a dithered projector intensity scaling map according to some embodiments. Referring to FIG. 25, projector platform 106 includes an intensity scaling module 2502 adapted to generate a dithered projector intensity map 2516 based on a primary projector intensity scaling map 2514. Intensity scaling module 2502 includes an intensity module 2506 that includes a primary selection module 2508, a dither selection module 2510, and an assignment module 2512.

Figure 26:
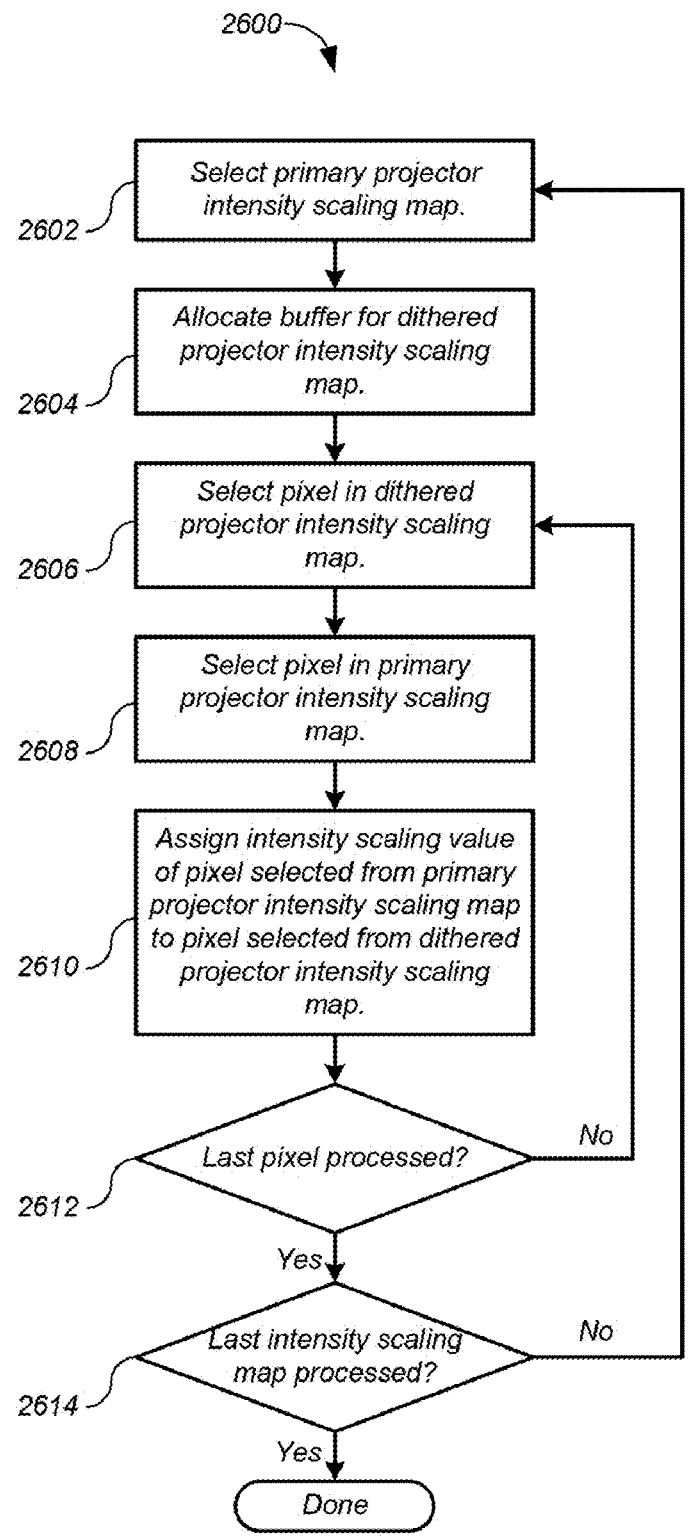
FIG. 26 shows a process for the projector platform of FIG. 25 for generating dithered projector intensity scaling maps according to some embodiments.

FIG. 26 shows a process 2600 for projector platform 106 of FIG. 25 for generating dithered projector intensity scaling maps according to some embodiments.

Process 2600 generates a dithered projector intensity scaling map for each primary projector intensity scaling map. Therefore, referring to FIG. 26, process 2600 begins with selection of a primary projector intensity scaling map by primary selection module 2508 (step 2602) and allocation of a buffer for the dithered projector intensity scaling map to be generated (step 2604). The dithered projector intensity scaling map has the same size as the respective primary projector intensity scaling map. Both intensity scaling maps are in projector coordinate space. That is, each addressable projector pixel corresponds to one respective pixel in the respective primary scaling map and one respective pixel in the dithered intensity scaling map. In some cases, multiple camera pixels can map to each projector pixel, or multiple projector pixels can map to each camera pixel. In such cases, the primary intensity scaling map is generated from an intensity scaling map in the virtual display space according to the projector's view projection matrix 2724.

Process 2600 generates an intensity value for each pixel in the new dithered projector intensity scaling map. Therefore, dither selection module 2510 selects a pixel in the dithered projector intensity scaling map (step 2606). Next primary selection module 2508 selects a pixel in the respective primary projector intensity scaling map based on the location of the pixel in the dithered projector intensity scaling map and one or more dimensions of the respective primary projector intensity scaling map (step 2608). For example, the width and height dimensions of the primary projector intensity scaling map can be used.

The use of the pixel location and map dimensions allows the selection of the primary projector intensity scaling map pixel to be limited to a suitable area surrounding the location of the corresponding dithered projector intensity scaling map pixel, thereby ensuring smooth dithering. For example, the distance between the two pixels can be limited to 20% of the width and/or height of the overlap region of the primary projector intensity scaling map, that is, the overlap region within which the pixel is located. A noise function can be used to introduce some randomness into the dithering process. For example, a sine function can be used.

With some functions, it is possible that the pixel selected by primary selection module 2508 will be outside the bounds of the respective primary projector intensity scaling map. If this is the case, then primary selection module 2508 selects the pixel in the primary projector intensity scaling map that has the same location as the pixel selected from the dithered projector intensity scaling map.

Once the corresponding pixels have been selected, assignment module 2512 assigns the intensity scaling value of the pixel selected from the primary projector intensity scaling map to the to the pixel selected from the dithered projector intensity scaling map (step 2610). These selection and assignment steps repeat until all of the pixels in the dithered projector intensity scaling map have been assigned intensities (step 2612). Process 2600 repeats until all of the primary projector intensity scaling maps have been processed (step 2614).

The projector intensity scaling maps generated above can be used to generate component projections 120 that, when combined on a display surface 104, form a seamless composite projection 122. Each composite projection is generated upon display surface 104 by projectors 102 based on a source image, the primary projector intensity scaling maps, and the dithered projector intensity scaling maps.

Figure 27:
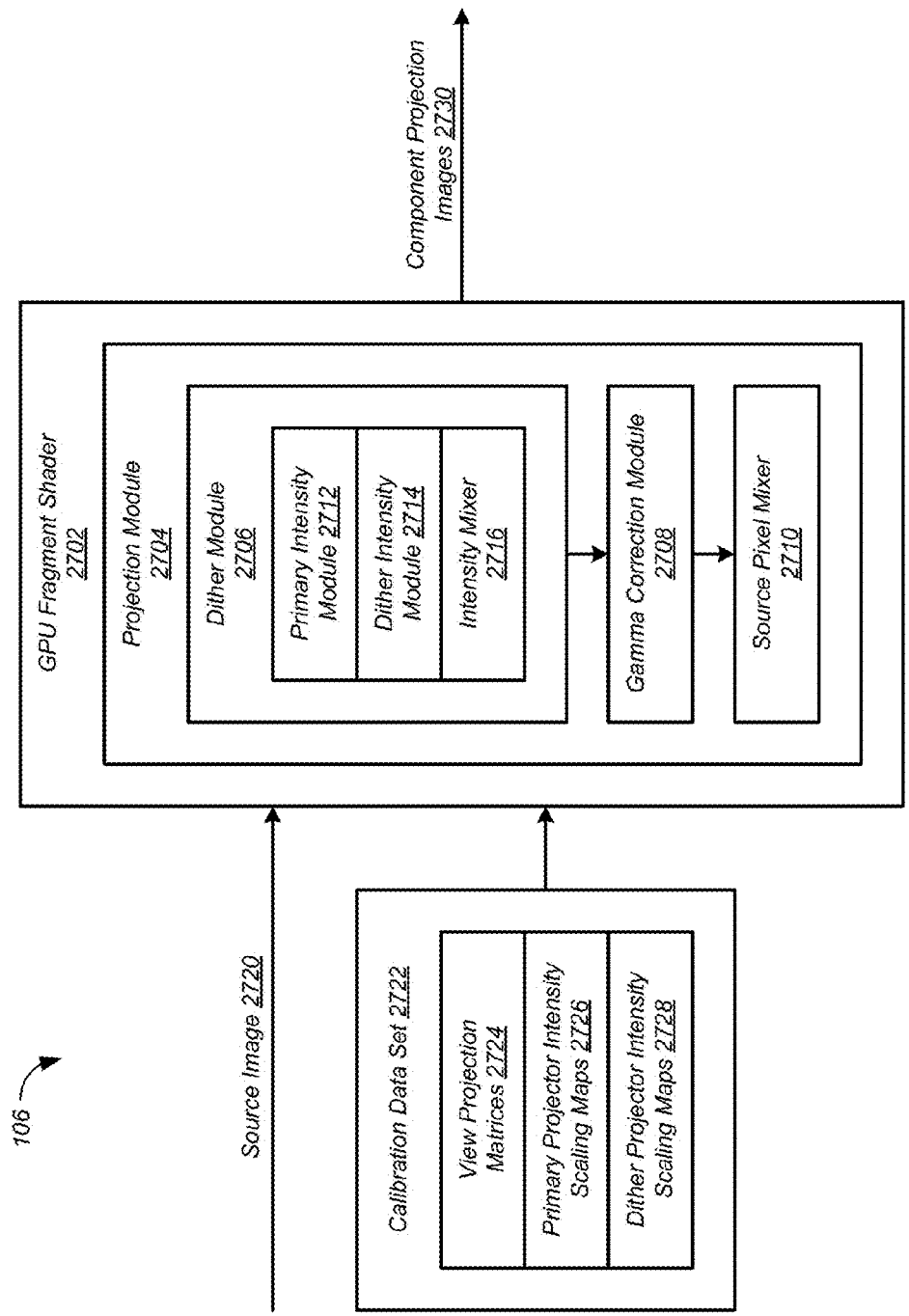
FIG. 27 shows elements of the projector platform of FIG. 1 for generating a projection image for a projector according to some embodiments.

FIG. 27 shows elements of projector platform 106 of FIG. 1 for generating a projection image for a projector 102 according to some embodiments. Referring to FIG. 27, projector platform 106 includes a GPU fragment shader 2702 that includes a projection module 2704. Projection module 2704 includes a dither module 2706, a gamma correction module 2708, and a source pixel mixer 2710. Dither module 2706 includes a primary intensity module 2712, a dither intensity module 2714, and an intensity mixer 2716. GPU fragment shader 2702 receives a source image 2720 and a calibration data set 2722 that includes, for each projector, a respective view projection matrix 2724, one or more primary projector intensity scaling maps 2726, and one or more dithered projector intensity scaling maps 2728. Based on these inputs, GPU fragment shader 2702 produces a respective component projection image 2730 for each projector 102.

Figure 28:
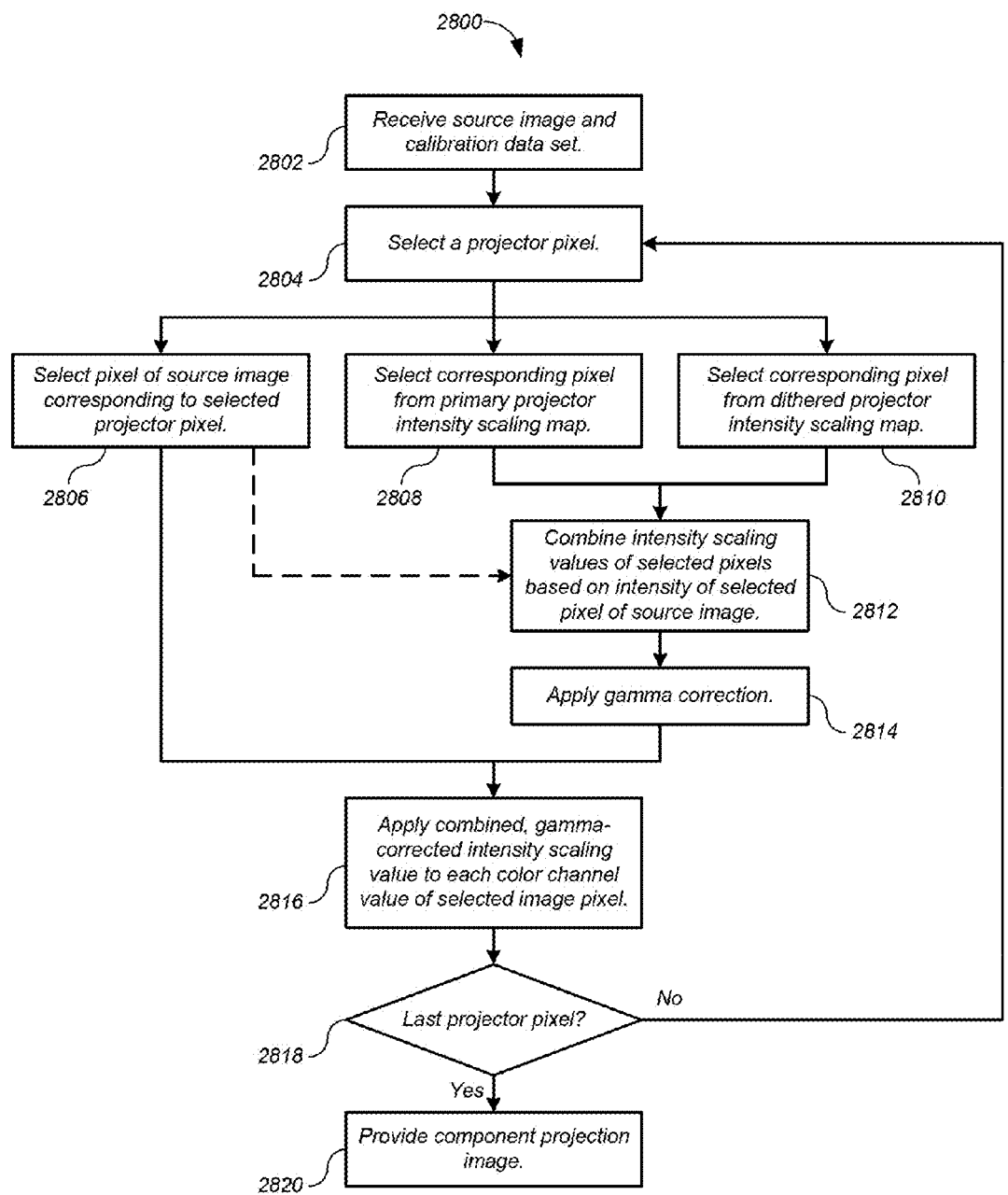
FIG. 28 shows a process for the projector platform of FIG. 27 for generating a component projection image for a projector based on a source image using a primary projector intensity scaling map and a dithered projector intensity scaling map according to some embodiments.

FIG. 28 shows a process 2800 for projector platform 106 of FIG. 27 for generating a component projection image 2730 for a projector 102 based on a source image 2720 using a primary projector intensity scaling map 2726 and a dithered projector intensity scaling map 2728 according to some embodiments. Referring to FIG. 28, projector platform 106 receives source image 2720 and a calibration data set 2722 for the projector (step 2802).

Each pixel of projector 102 is processed individually. Therefore, dither module 2706 selects a projector pixel (step 2804). Dither module 2706 also selects the pixel of source image 2720 corresponding to the selected projector pixel (step 2806). When multiple pixels of source image 2720 correspond to the selected projector pixel, the source image pixels are combined into a single pixel, for example using averaging techniques.

Primary intensity module 2712 selects the corresponding pixel from the primary projector intensity scaling map (step 2808). Dither intensity module 2714 selects the corresponding pixel from the dithered projector intensity scaling map (step 2810). Intensity mixer 2716 combines the intensity scaling values of the selected pixels, based on the intensity of the pixel selected from source image 2720, to produce a single projector pixel intensity scaling value (step 2812). For example, intensity mixer 2716 can use a weighted average of the intensity scaling values, where the weighting depends upon the brightness of the selected pixel of source image 2720. For a bright source pixel, the primary intensity scaling value is weighted more heavily, while for a dim source pixel, the dither intensity scaling value is weighted more heavily. This approach serves to mitigate the stair-stepping effect shown in FIG. 23. Alternatively, the dither intensity scaling value can be included in the average only when the brightness of the selected pixel of source image 2720 falls below a predetermined threshold. As another example, two thresholds can be used to generate three brightness ranges, where the dither intensity scaling value is used alone in the dimmest range, the primary intensity scaling value is used alone in the brightest range, and an average of the two is used in the middle range.

In some embodiments, gamma correction module 2708 applies a gamma correction to the projector pixel intensity scaling values before applying those values to the pixels of source image 2720 (step 2814). Additive light output by projectors 102 may not visually blend according to the intensity scaling alone. This is because the brightness of the actual light output on the display surface 104 is a function of how projectors 102 map RGB pixel values to perceived intensity. RGB pixel values represent linear luminance and are encoded into color signals having non-linear perceived intensity. Output devices such as projectors 102 use gamma expansion, applying a decoding gamma to the non-linear gamma power-law function, to convert RGB pixel values back into color voltage signals in a linear intensity domain. Correcting output brightness levels can be done by applying an inverse transfer function, or gamma correction, to the RGB pixel values to keep the desired end-to-end response perceptually linear. In other words, the pixels of source image 2720 are deliberately distorted so that the gamma expansion operation on the output devices will emit pixels whose combined light will be at the expected brightness. By providing each projector 102 with gamma-corrected intensity values in the overlap regions 124, the additive light output will perceptually blend as expected.

After gamma correction, the projector pixel intensity scaling value is applied to each color channel value of the selected pixel of source image 2720 (step 2816). This process repeats until all of the projector pixels have been processed (step 2818). The resulting pixels are provided as component projection image 2730 (step 2820).

FIG. 29 shows pseudo-code for intensity scaling according to one embodiment. FIGS. 30A-C show code for an example implementation using a fragment shader program for GPU processing.

Figure 31:
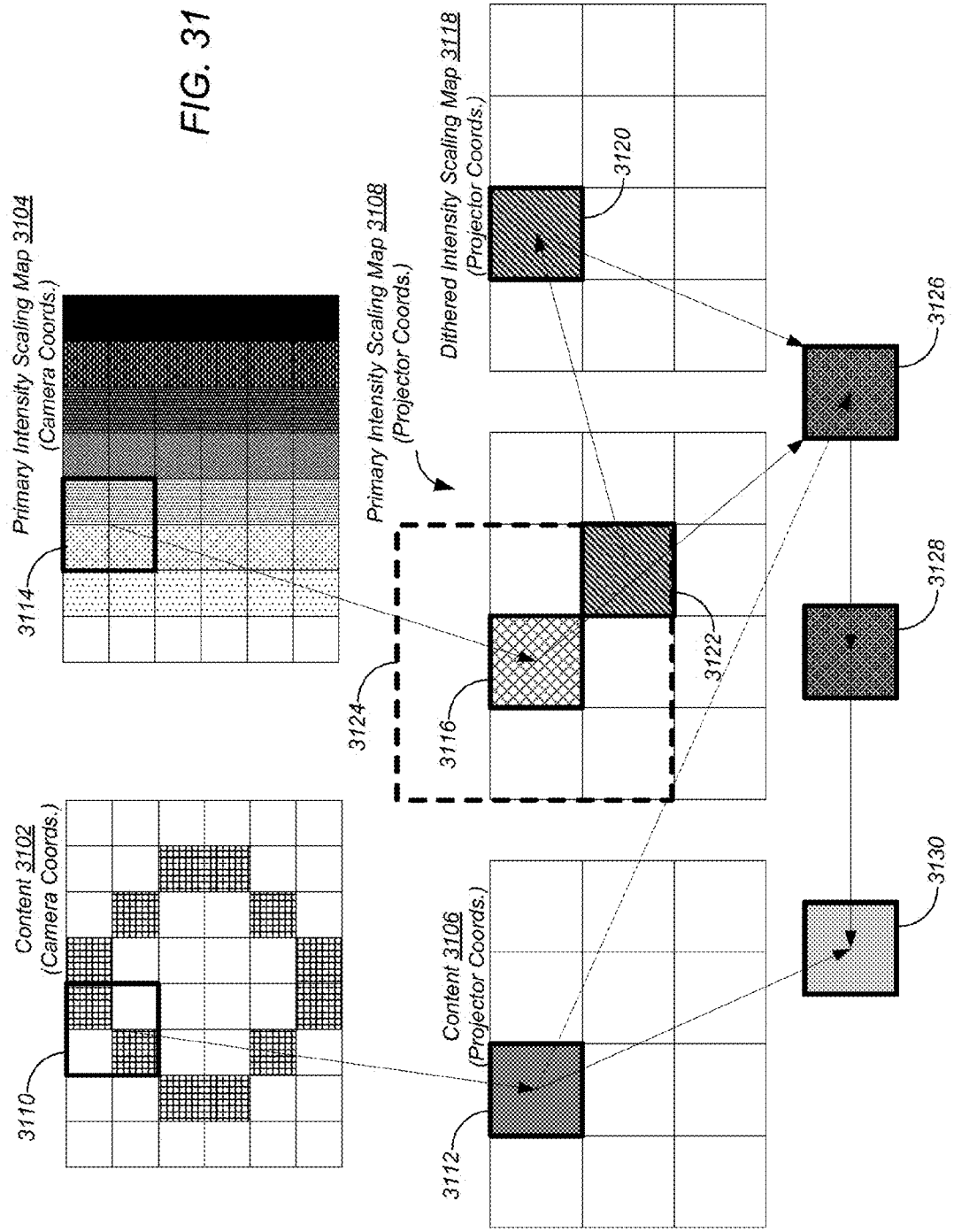
FIG. 31 illustrates an example dithering process according to some embodiments.

FIG. 31 illustrates an example dithering process according to some embodiments. Referring to FIG. 31, the process begins with content 3102 and a primary projector intensity scaling map 3104, both in the virtual display space (that is, camera coordinates). In this example, content 3102 lies entirely within an overlap region of a projector 102.

Also in this example, each projector pixel corresponds to four camera pixels. Therefore, a mapping is applied to content 3102 and primary projector intensity scaling map 3104, for example using a view projection matrix 2724, to produce content 3106 and primary projector intensity scaling map 3108, which are in the projector space (that is, projector coordinates). In particular, the four content pixels shown at 3110 are combined to produce pixel 3112, and the four intensity scaling map pixels shown at 3114 are combined to produce pixel 3116.

Next dithered intensity scaling map 3118 is generated, also in the projector space. Pixel 3120, which has the same coordinates as pixel 3116, is generated based on those coordinates and the dimensions of intensity scaling maps 3108 and 3118. Recall that, in this simple example, content 3102 lies entirely within an overlap region of a projector 102, as do the corresponding intensity scaling maps 3108 and 3118. Therefore, the dimensions of intensity scaling maps 3108 and 3118 are the dimensions of the overlap region for projector 102. These dimensions are used to select a bounding region 3124 surrounding pixel 3116. A pixel 3122 is selected in primary projector intensity scaling map 3108 within bounding region 3124. Then the intensity scaling value of pixel 3122 is assigned to pixel 3120. The intensity scaling values of pixels 3116 and 3120 are combined according to the brightness of content pixel 3112, as shown at 3126. The resulting intensity scaling value at 3126 is then gamma-corrected, as shown at 3128. The gamma-corrected intensity scaling value is then applied to content pixel 3112, as shown at 3130.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of this disclosure. Accordingly, other implementations are within the scope of the following claims.

What is claimed is:

1. Tangible computer-readable media embodying instructions executable by a computer to perform a method comprising:
   receiving a first digital image representing a first composite projection on a display surface, wherein each first composite projection comprises a plurality of overlapping component projections, wherein each of the component projections is generated by a respective projector; and
   generating one or more respective first intensity scaling maps for each of the projectors, comprising, for each of the first intensity scaling maps
      identifying a displayed non-overlap projection region for the projector associated with the first intensity scaling map based on the first digital image, wherein the displayed non-overlap projection region is that portion of the respective first component projection that is within a maximum display area of the composite projection, but does not overlap with any other component projection, and
      generating a first intensity scaling map for the projector, comprising
         determining a distance to the nearest pixel within the displayed non-overlap region of the projector for each pixel outside the non-overlap region of the projector, and
         assigning a first intensity scaling value to each pixel outside the displayed non-overlap region of the projector based on the respective distance;
   wherein a second composite projection is generated upon the display surface by the projectors based on a second digital image and the first intensity scaling maps.

2. The tangible computer-readable media of claim 1, wherein generating a first intensity scaling map for the projector further comprises:
   assigning a minimum first intensity scaling value to each pixel inside the non-overlap region.

3. The tangible computer-readable media of claim 1, wherein generating the first intensity scaling map for the projector further comprises, before computing the distances:
   selecting a bounding rectangle containing the respective component projection in the first digital image; and
   copying contents of the bounding rectangle to a rectangular image, wherein the short side of the rectangular image is at least twice as long as the long side of the bounding rectangle.

4. The tangible computer-readable media of claim 3, wherein generating the first intensity scaling map for the projector further comprises, after computing the distances:
   cropping the rectangular image according to the respective component projection;

masking the rectangular image according to the maximum display area of the respective composite projection; and
masking the rectangular image according to the respective projector bounding rectangle.

5. The tangible computer-readable media of claim 1, wherein the method further comprises:
generating a respective second intensity scaling map based on each first intensity scaling map, comprising generating second intensity scaling values for each second intensity scaling map based on the first intensity scaling values of the respective first intensity scaling map;
wherein the second composite projection is generated upon the display surface by the projectors based on the second digital image, the first intensity scaling maps, and the second intensity scaling maps.

6. The tangible computer-readable media of claim 5, wherein generating the second intensity scaling values further comprises:
selecting a first pixel of one of the second intensity scaling maps;
selecting a second pixel of the respective first intensity scaling map based on a location of the first pixel in the one of the second intensity scaling maps and a dimension of the respective first intensity scaling map; and
assigning the intensity scaling value of the second pixel to the first pixel.

7. The tangible computer-readable media of claim 5, wherein the method further comprises:
generating a respective component projection image for each of the projectors based on the one or more respective first intensity scaling maps, the one or more respective second intensity scaling maps, and intensity values of the second digital image;
wherein the second composite projection is generated upon the display surface by the projectors based on the respective component projection images.

8. An apparatus comprising:
an input module adapted to receive a first digital image representing a first composite projection on a display surface, wherein each first composite projection comprises a plurality of overlapping component projections, wherein each of the component projections is generated by a respective projector; and
a first intensity scaling module adapted to generate a respective first intensity scaling map for each of the projectors, comprising
a region module adapted to identify a respective displayed non-overlap projection region for each projector based on the first digital image, wherein each displayed non-overlap projection region is within a maximum display area of the first composite projection, but does not overlap with any other component projection, and
a map module adapted to generate a respective first intensity scaling map for each projector, comprising
a distance module adapted to determine a distance to the nearest pixel within the displayed non-overlap region of the projector for each pixel outside the non-overlap region of the projector, and
a first intensity module adapted to assign a first intensity scaling value to each pixel outside the displayed non-overlap region of the projector based on the respective distance;
wherein a second composite projection is generated upon the display surface by the projectors based on a second digital image and the first intensity scaling maps.

9. The apparatus of claim 8:
wherein the intensity module assigns a minimum first intensity scaling value to each pixel inside the non-overlap regions.

10. The apparatus of claim 8:
wherein the distance module, before computing the distances,
selects a bounding rectangle containing the respective component projection in the first digital image, and
copies contents of the bounding rectangle to a rectangular image, wherein the short side of the rectangular image is at least twice as long as the long side of the bounding rectangle.

11. The apparatus of claim 10:
wherein the distance module, after computing the distances,
crops the rectangular image according to the respective component projection;
masks the rectangular image according to the maximum display area of the respective composite projection; and
masks the rectangular image according to the respective projector bounding rectangle.

12. The apparatus of claim 8, further comprising:
a second intensity scaling module adapted to generate a respective second intensity scaling map based on each first intensity scaling map, comprising
a second intensity module adapted to generate second intensity scaling values for each second intensity scaling map based on the first intensity scaling values of the respective first intensity scaling map;
wherein the second composite projection is generated upon the display surface by the projectors based on the second digital image, the first intensity scaling maps, and the second intensity scaling maps.

13. The apparatus of claim 12, wherein the second intensity module comprises:
a first selection module adapted to select a first pixel of one of the second intensity scaling maps;
a second selection module adapted to select a second pixel of the respective first intensity scaling map based on a location of the first pixel in the one of the second intensity scaling maps and a dimension of the respective first intensity scaling map; and
an assignment module adapted to assign the intensity scaling value of the second pixel to the first pixel.

14. The apparatus of claim 12, further comprising:
a projection module adapted to generate a respective component projection image for each of the projectors based on the one or more respective first intensity scaling maps, the one or more respective second intensity scaling maps, and intensity values of the second digital image;
wherein the second composite projection is generated upon the display surface by the projectors based on the respective component projection images.

15. A method comprising:
receiving a first digital image representing a first composite projection on a display surface, wherein each first composite projection comprises a plurality of overlapping component projections, wherein each of the component projections is generated by a respective projector; and
generating one or more respective first intensity scaling maps for each of the projectors, comprising, for each of the first intensity scaling maps
identifying a displayed non-overlap projection region for the projector associated with the first intensity scaling map based on the first digital image,
wherein the displayed non-overlap projection region is that portion of the respective first component projection that is within a maximum display area of the composite projection, but does not overlap with any other component projection, and generating a first intensity scaling map for the projector, comprising determining a distance to the nearest pixel within the displayed non-overlap region of the projector for each pixel outside the non-overlap region of the projector, and assigning a first intensity scaling value to each pixel outside the displayed non-overlap region of the projector based on the respective distance;

wherein a second composite projection is generated upon the display surface by the projectors based on a second digital image and the first intensity scaling maps.

16. The method of claim 15, wherein generating a first intensity scaling map for the projector further comprises:

assigning a minimum first intensity scaling value to each pixel inside the non-overlap region.

17. The method of claim 15, wherein generating the first intensity scaling map for the projector further comprises, before computing the distances:

selecting a bounding rectangle containing the respective component projection in the first digital image; and copying contents of the bounding rectangle to a rectangular image, wherein the short side of the rectangular image is at least twice as long as the long side of the bounding rectangle.

18. The method of claim 17, wherein generating the first intensity scaling map for the projector further comprises, after computing the distances:

cropping the rectangular image according to the respective component projection;

masking the rectangular image according to the maximum display area of the respective composite projection; and masking the rectangular image according to the respective projector bounding rectangle.

19. The method of claim 15, further comprising:

generating a respective second intensity scaling map based on each first intensity scaling map, comprising generating second intensity scaling values for each second intensity scaling map based on the first intensity scaling values of the respective first intensity scaling map;

wherein the second composite projection is generated upon the display surface by the projectors based on the second digital image, the first intensity scaling maps, and the second intensity scaling maps.

20. The method of claim 19, wherein generating the second intensity scaling values further comprises:

selecting a first pixel of one of the second intensity scaling maps;

selecting a second pixel of the respective first intensity scaling map based on a location of the first pixel in the one of the second intensity scaling maps and a dimension of the respective first intensity scaling map; and assigning the intensity scaling value of the second pixel to the first pixel.

21. The method of claim 19, further comprising:

generating a respective component projection image for each of the projectors based on the one or more respective first intensity scaling maps, the one or more respective second intensity scaling maps, and intensity values of the second digital image;

wherein the second composite projection is generated upon the display surface by the projectors based on the respective component projection images.

* * * * *